United States Patent
Brinkmann et al.

(10) Patent No.: US 9,037,768 B2
(45) Date of Patent: May 19, 2015

(54) VIRTUAL-INTERRUPT-MODE INTERFACE AND METHOD FOR VIRTUALIZING AN INTERRUPT MODE

(75) Inventors: Hubert E. Brinkmann, Spring, TX (US); Paul V. Brownell, Houston, TX (US); David L. Matthews, Cypress, TX (US); Dwight D. Riley, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1229 days.

(21) Appl. No.: 12/937,685

(22) PCT Filed: Apr. 28, 2008

(86) PCT No.: PCT/US2008/005448
§ 371 (c)(1),
(2), (4) Date: Oct. 13, 2010

(87) PCT Pub. No.: WO2009/134218
PCT Pub. Date: Nov. 5, 2009

(65) Prior Publication Data
US 2011/0047309 A1 Feb. 24, 2011

(51) Int. Cl.
*G06F 13/24* (2006.01)
*G06F 9/455* (2006.01)

(52) U.S. Cl.
CPC .......... *G06F 13/24* (2013.01); *G06F 2213/0026* (2013.01); *G06F 9/45558* (2013.01); *G06F 2009/45579* (2013.01)

(58) Field of Classification Search
CPC . G06F 13/24; G06F 9/45558; G06F 2213/26; G06F 2009/45579

USPC ........................................................ 710/261
See application file for complete search history.

(56) References Cited

U.S. PATENT DOCUMENTS

| 5,619,703 A | 4/1997 | Omid et al. | |
|---|---|---|---|
| 5,812,858 A * | 9/1998 | Nookala et al. | 710/260 |

(Continued)

FOREIGN PATENT DOCUMENTS

| CN | 1514364 | 7/2004 |
|---|---|---|
| JP | 2008--090375 | 4/2008 |
| KR | 2001-0005141 | 1/2001 |

OTHER PUBLICATIONS

Chinese. Office Action cited in Appl. No. 200880128884.1 dated Oct. 15, 2013; 6 pages.

(Continued)

*Primary Examiner* — Nimesh G Patel
(74) *Attorney, Agent, or Firm* — Olympic Patent Works PLLC

(57) ABSTRACT

Embodiments of the present invention are directed to methods for virtualizing interrupt modes on behalf of interrupt-generating devices, including I/O-device controllers, so that newer interrupt-generating devices that lack older interrupt modes can be used in systems that continue to rely on older interrupt modes. In one embodiment of the present invention, a PCIe switch or PCIe-based host bridge is modified, or a new component introduced, to provide an interrupt-mode virtualizing function, or virtual interrupt-mode interface, that provides a virtual interrupt mode on behalf of interrupt-generating devices, such as I/O-device controllers, to operating systems, BIOS layers, and other components that communicate with the I/O-device controllers.

20 Claims, 23 Drawing Sheets

(56) References Cited

U.S. PATENT DOCUMENTS

| | | |
|---|---|---|
| 6,629,179 B1 | 9/2003 | Bashford |
| 7,209,994 B1 | 4/2007 | Klaiber et al. |
| 7,979,592 B1 * | 7/2011 | Pettey et al. .................. 710/3 |
| 8,458,387 B2 * | 6/2013 | Brice et al. .................. 710/269 |
| 8,572,635 B2 * | 10/2013 | Craddock et al. ............. 719/321 |
| 2005/0033895 A1 * | 2/2005 | Lueck et al. .................. 710/311 |
| 2005/0228923 A1 * | 10/2005 | Zimmer et al. ............... 710/269 |
| 2005/0289271 A1 * | 12/2005 | Martinez et al. .............. 710/260 |
| 2007/0005858 A1 | 1/2007 | Shah et al. |
| 2007/0260796 A1 * | 11/2007 | Grossman et al. ............ 710/269 |
| 2008/0082713 A1 * | 4/2008 | Tsuruta ........................ 710/268 |

OTHER PUBLICATIONS

International Search Report and Written Opinion, dated Dec. 19, 2008, 10 pages.

Supplementary European Search Report dated May 27. 2011 for EP Application No. EP 08 75 4129.

Tom Long Nguyen et al, PCI Express Port Bus Driver Support for Linux, 2005 Linux Symposium, 12 Pages.

* cited by examiner

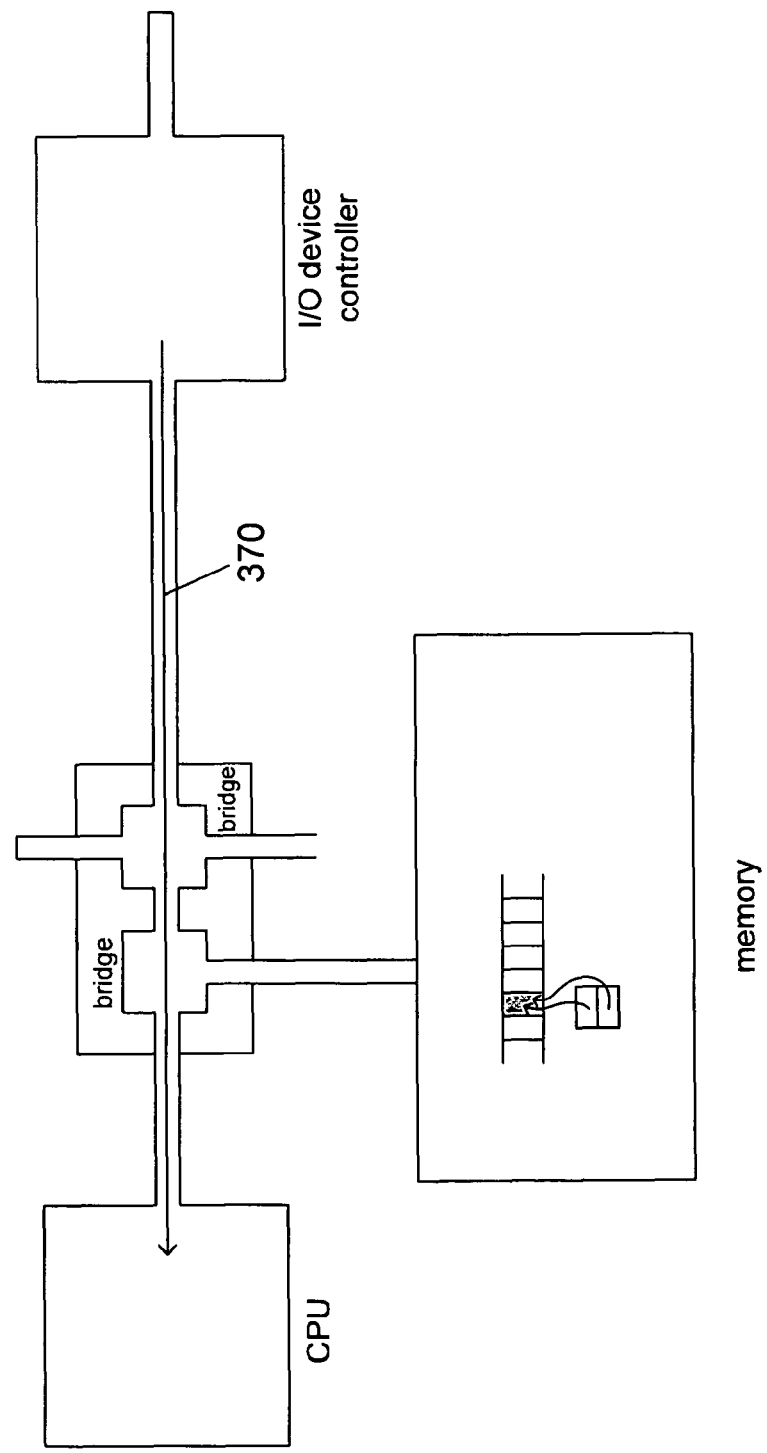

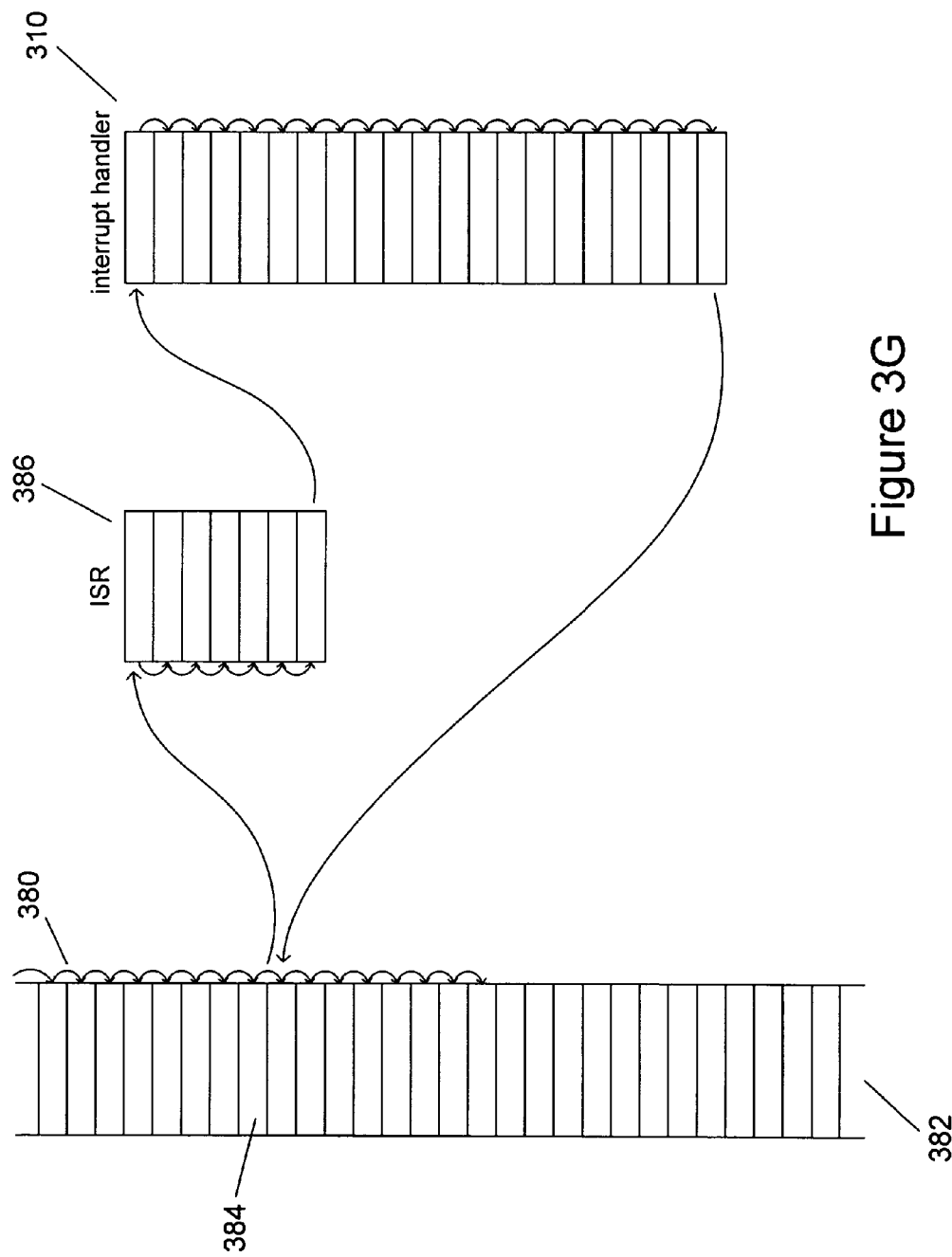

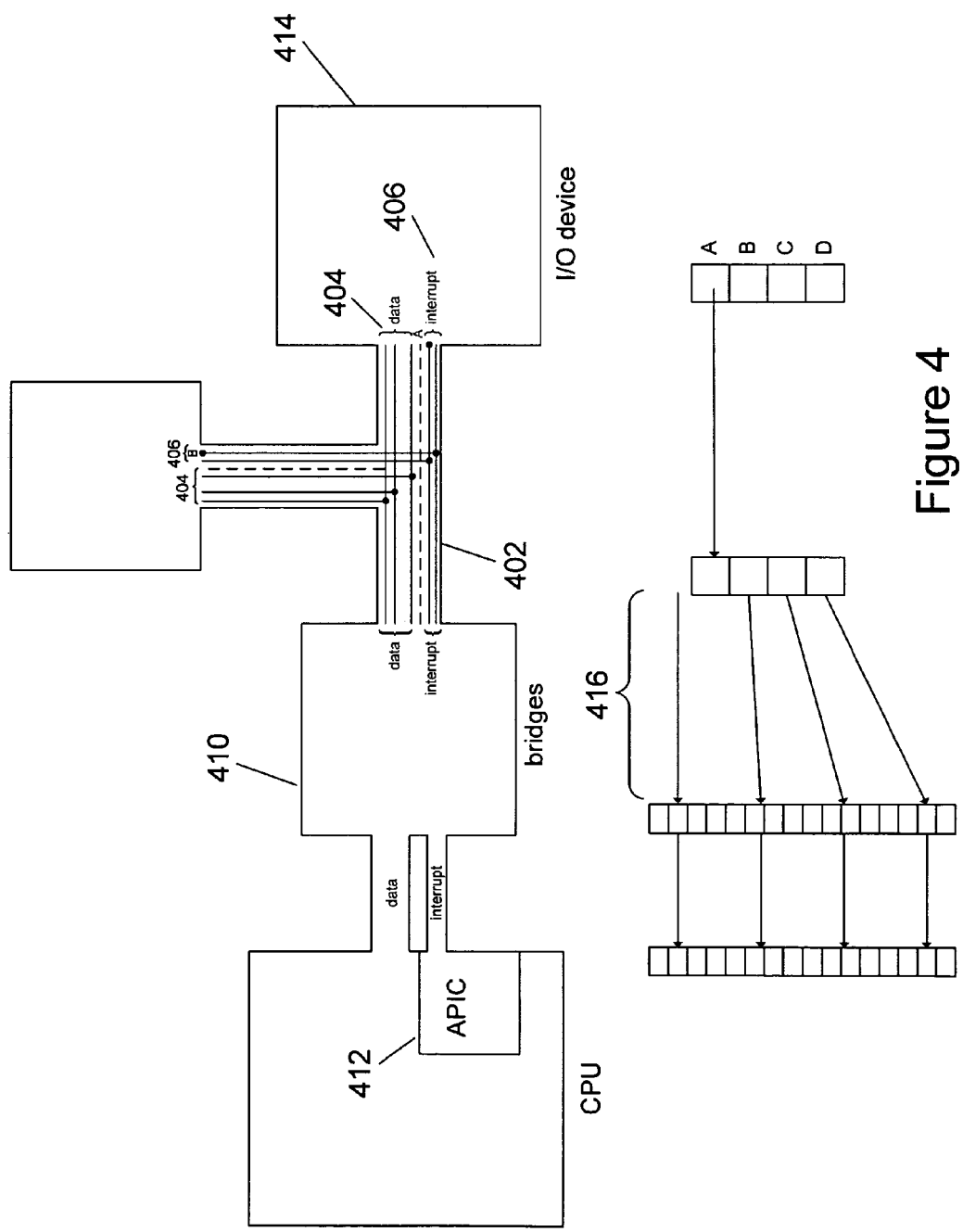

VIRTUAL-INTERRUPT-MODE INTERFACE AND METHOD FOR VIRTUALIZING AN INTERRUPT MODE

TECHNICAL FIELD

The present invention is related to interrupts and interrupt-mode compatibility among components of a system and, in particular, to a method for virtualizing interrupt modes on behalf of interrupt-generating devices in order that the interrupt-generating devices can properly interoperate with other system components.

BACKGROUND OF THE INVENTION

In previous generations of computer hardware and computer systems, a variety of different types of parallel busses were employed for interconnecting components, such as interconnecting peripheral I/O devices to a processor-and-memory bus through host bridges. Initially, busses comprising parallel signal lines to enable simultaneous transfer of bytes, 16-bit words, 32-bit words, or 64-bit words, provided higher data-transfer bandwidths than serial communications media, in which bit values are transferred consecutively, one after another, and coalesced by a receiving port into bytes, 16-bit words, 32-bit words, or 64-bit words. However, at high clock rates, signal skew between the parallel signal lines in a bus can become an increasingly difficult problem, and, as the densities of features within microprocessors and other integrated circuits have decreased, the large number of pins needed to connect an integrated-circuit component with a parallel bus represents an increasing cost and spatial constraint relative to processing power. As a result, serial communications media can now provide greater data-transfer bandwidths, are easier to incorporate into systems, place fewer constraints on integrated-circuit design and packaging, and are, in addition, more economical, than the older parallel busses. Older bus-based communications media, including the peripheral component interconnect ("PCI") and advanced technology attachment ("ATA") are being replaced by faster, more economical serial communications media, such as PCIe and SATA.

The process by which older technologies are replaced with newer technologies is generally gradual, as a result of which efforts are made to incorporate backwards compatibility in the newer technologies. For example, the newer PCIe provides backwards-compatibility features so that older components, designed to interface with PCI-based components, can interface with newer PCIe-based components. However, despite the efforts to provide for backwards compatibility during the introduction of newer technologies, problems arise. As one example, although newer PCIe serial communications media and controllers provide emulation of multi-dedicated-pin-and-trace-based interrupt mechanisms used in PCI communications media using messages transmitted through the newer serial communications media, new PCIe-compatible peripheral devices, such as I/O-device controllers, may fail to implement older PCI interruption modes. Although the newer PCIe-based devices that do not support older PCI-based interrupt modes correctly interoperate with computer systems designed to support PCIe-based components, such devices may not function correctly in older computer systems retrofitted with PCIe interconnects, despite being compatible with the PCIe interconnects. Designers, manufacturers, vendors, and users of computer systems that, during technology transition, incorporate both older-technology components and newer-technology components therefore continuously recognize the need for methods and devices to facilitate bridging of incompatibilities between newer-technology components and older-technology components, such as incompatibilities between operating systems and basic-input-output-system ("BIOS") layers designed to interface with older-technology components that continue to be used in computer systems that incorporate, or connect to, newer-technology components.

SUMMARY OF THE INVENTION

Embodiments of the present invention are directed to methods for virtualizing interrupt modes on behalf of interrupt-generating devices, including I/O-device controllers, so that newer interrupt-generating devices that lack older interrupt modes can be used in systems that continue to rely on older interrupt modes. In one embodiment of the present invention, a PCIe switch or PCIe-based host bridge is modified, or a new component introduced, to provide an interrupt-mode virtualizing function, or virtual interrupt-mode interface, that provides a virtual interrupt mode on behalf of interrupt-generating devices, such as I/O-device controllers, to operating systems, BIOS layers, and other components that communicate with the I/O-device controllers. By providing the interruption-mode virtualizing feature, a host bridge, PCIe switch, or additional component provides an older-technology-interrupt-mode interface to upstream components, including one or more CPUs that execute a BIOS and/or one or more operating systems, although the interrupt-generating device no longer supports the older-technology-interrupt mode.

BRIEF DESCRIPTION OF THE DRAWINGS

FIGS. 3A-G illustrate communication between an I/O-device controller and a CPU running an operating system program within a generic computer system.

FIG. 4 illustrates the INTx interrupt mechanism employed in the PCI-bus architecture.

DETAILED DESCRIPTION OF THE INVENTION

The present invention is directed to an interrupt-mode virtualization function that can be incorporated into a switch, host bridge, or other component that lies between an interrupt-generating device, such as an I/O-device controller, and an interrupt-receiving CPU. One embodiment of the present invention is an interrupt-mode virtualization feature included in a PCIe switch or PCIe-compatible host bridge. However, interrupt-mode virtualization may be incorporated into a number of different components within a number of different types of communications media.

Figure 1:
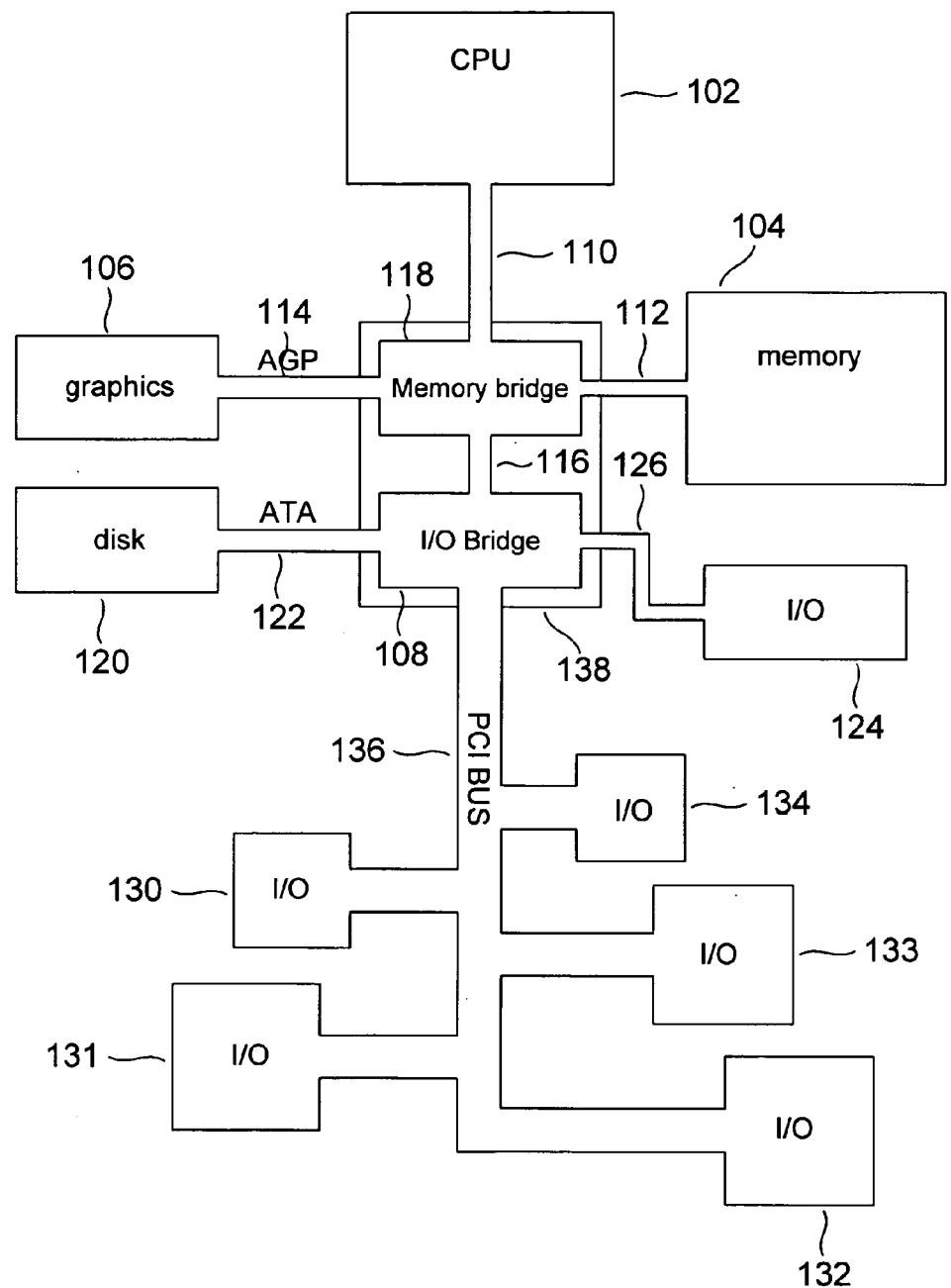
FIG. 1 shows a generalized block diagram of a simple computer system that includes a PCI parallel interconnect.

FIG. 1 shows a generalized block diagram of a simple computer system that includes a PCI parallel interconnect. The computer system includes a central processing unit ("CPU") 102 interconnected with a memory 104, a graphics-rendering device 106, and an I/O bridge 108 by a processor system bus 110, memory bus 112, advanced graphics port ("AGP") bus 114, and an internal host-bridge bus 116, respectively. The I/O bridge 108 serves to interconnect additional devices to the memory bridge 118, and therefore to the memory 104 and CPU 102. These additional devices include a disk drive 120 interconnected with the I/O bridge via an ATA link 122, one or more I/O-device controllers 124 interconnected with the I/O bridge 108 via other types of communications media, such as serial links 126, and a number of I/O-device controllers 130-134 via a PCI bus 136. The I/O bridge 108 and memory bridge 118 together compose a host bridge 138.

The PCI bus 136 is a true, parallel bus, access to which is obtained by contention between the various devices connected to the PCI bus. The bus addresses correspond to slots for devices on the PCI bus, different types of PCI busses providing for different numbers of slots. A device acquiring a PCI bus can employ the entire bandwidth of the PCI bus for transfer of data to a selected target device. Although not shown in FIG. 1, the PCI bus may be additionally bridged, through an additional bridge device, to one or more additional types of data busses and other interconnect media. The I/O-device controllers 130-134 may be control any of various types of peripheral devices, including, for example, Ethernet controllers that receive and transmit data over external communications media, that store and retrieve data from memory 104 over the PCI bus, data from memory 104 over the PCI bus, that generate interrupts directed to the CPU 102, and that receive commands from the CPU.

Communications busses, such as the PCI bus, include complex hardware and firmware and transfer data according to hierarchical layers of protocols. An enormous amount of information on the PCI bus is available in textbooks and via the Internet, including detailed discussions of the protocol stacks, programming interfaces, hardware operation and characteristics, and hardware implementation.

During the past decade, the limitations of the PCI-bus architecture were recognized, and have grown more pronounced as the frequencies of microprocessors and system interconnects have increased, as integrated-circuit densities have increased, and as bandwidths of external communications media, including the Ethernet, have increased. As the PCI-bus architecture was pressed for increased bandwidth, key problems associated with parallel bus architectures limited the extent to which the frequency of operation of PCI components could be increased. Furthermore, the PCI requires a large number of pins for connecting each device, and the expense and footprint of the multi-pin-based connections grown increasingly burdensome as the densities of features on silicon-wafer-based integrated circuits can be produced has continued to increase. Furthermore, contention-based arbitration for accessing a bus limits the number of devices that can be connected to the bus, at the same time that the demand for interconnection of devices has begun to steeply increase. For all of these reasons, a new PCIe interconnect architecture was developed and deployed during the past five years.

PCIe provides higher-level-protocol compatibility with the PCI architecture, but is based on direct, serial communications links between connected devices managed through crossbar-like switches. Each point-to-point interconnection between PCIe end points and a PCIe switch comprises one or more lanes, each lane comprising two pairs of differentially driven serial lines, one pair for transmission from the end point to the switch, and one pair for from transmission from the switch to the end point. Thus, each lane provides for full-duplex communications between an end point and a switch. A given link between a PCIe end point and PCIe switch can comprise one, two, four, eight, 12, 16, or 32 lanes, so that the aggregate bandwidth for communications bandwidth for communications between an end point and switch can be tailored to meet the demands of the end point device and the system, as a whole. Switches can be interconnected with one another for hierarchical fan-out to large numbers of devices.

Figure 2:
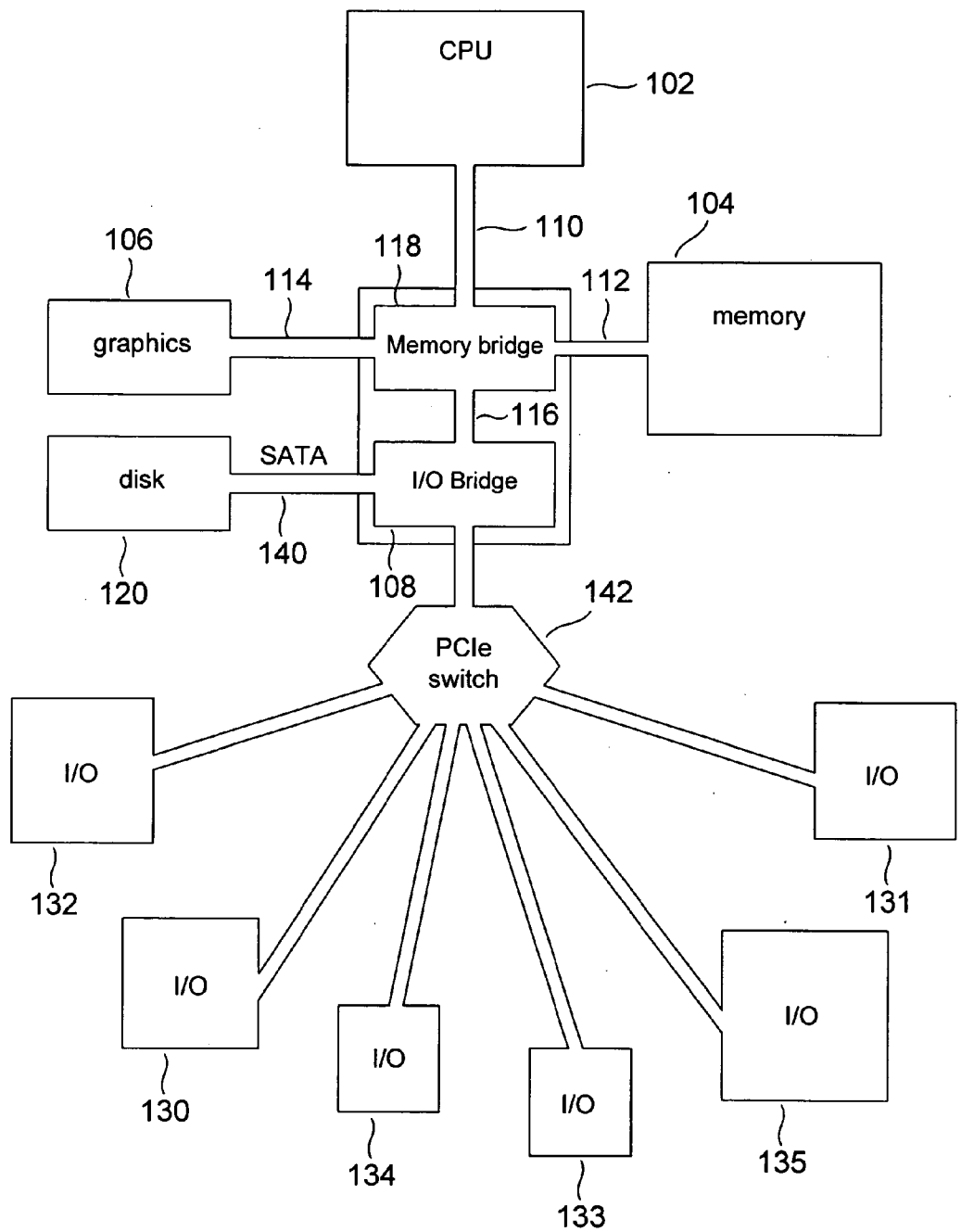
FIG. 2 provides a high-level, block-diagram-like representation of a simple computer system that includes a PCIe serial interconnect rather than a PCI parallel interconnect.

FIG. 2 provides a high-level, block-diagram-like representation of a simple computer system that includes a PCIe serial interconnect medium rather than a PCI parallel bus. Many of the components of the system shown in FIG. 2 are identical to the components shown in FIG. 1, and are identically numerically labeled. However, rather than the ATA parallel bus (122 in FIG. 1), a serial communications medium, an SATA interconnect 140, is employed in the system in FIG. 2 to reflect the trend towards higher-bandwidth, less expensive serial communications media in place of parallel communications media. The I/O bridge 108 is modified to include PCIe ports and a multi-lane interconnection to the PCIe switch 142, rather than a multi-pin-based connection to a PCI parallel bus. The PCIe switch serves as a crossbar-like switch for establishing point-to-point interconnection between the I/O bridge and the various PCIe end, points 130-135, and can also provide point-to-point interconnection of endpoint devices. Multiple point-to-point connections may transfer data simultaneously through the PCIe switch. While the lower-level protocol layers within the I/O bridge need to be changed to accommodate the PCIe communications medium, the higher-level protocol layers are compatible with the older PCI protocols, so that components of the system upstream from the I/O bridge may continue to communicate with the I/O devices using older PCI protocols. Currently, each of the two pairs of serial communications lines within a PCIe lane can transfer 2.5 gigabits per second, for a total full-duplex bandwidth of 5 gigabits per second. In the second generation of PCIe, the bandwidth has been doubled, and in the third generation of PCIe, the bandwidth is anticipated to be again significantly increased.

Figure 3A:
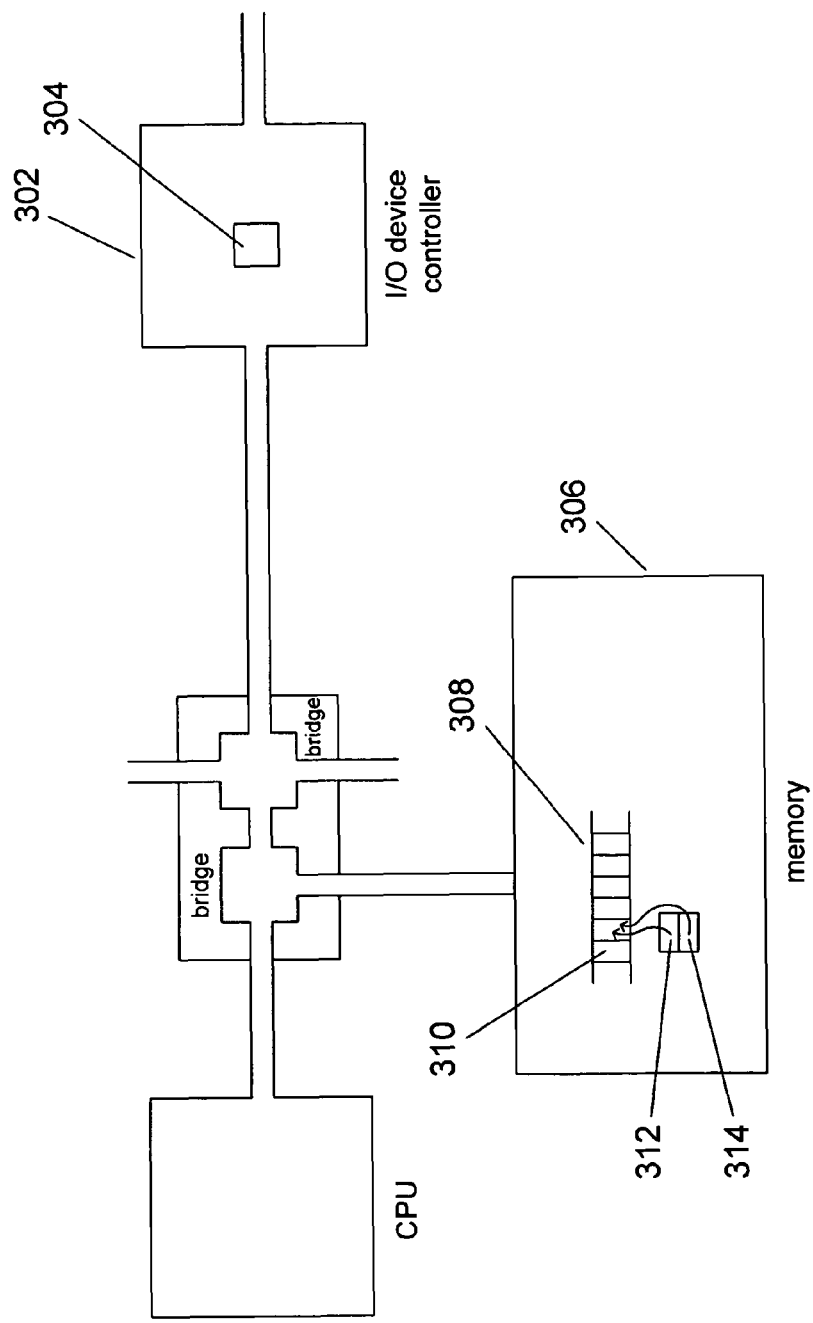
Figure 3B:
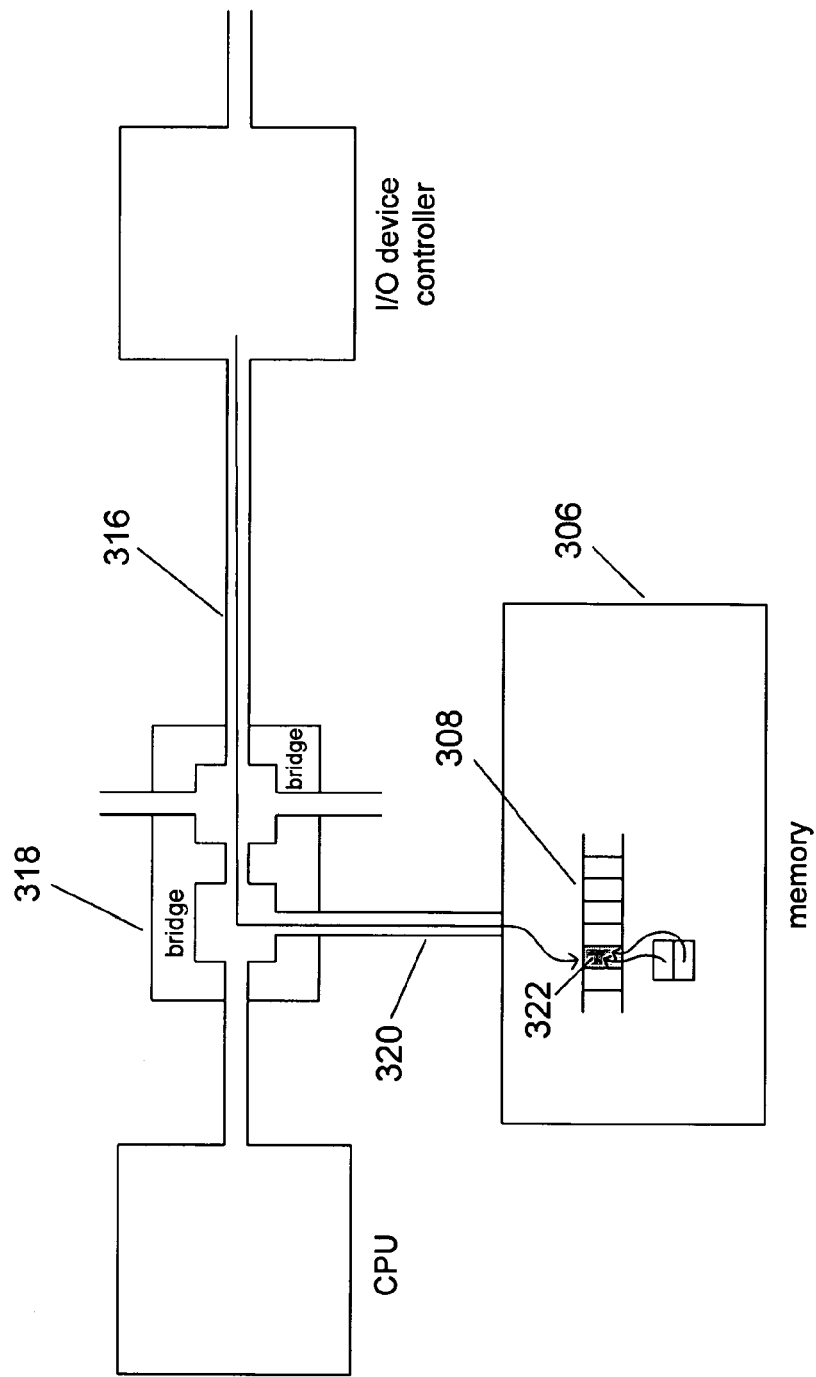
Figure 3C:
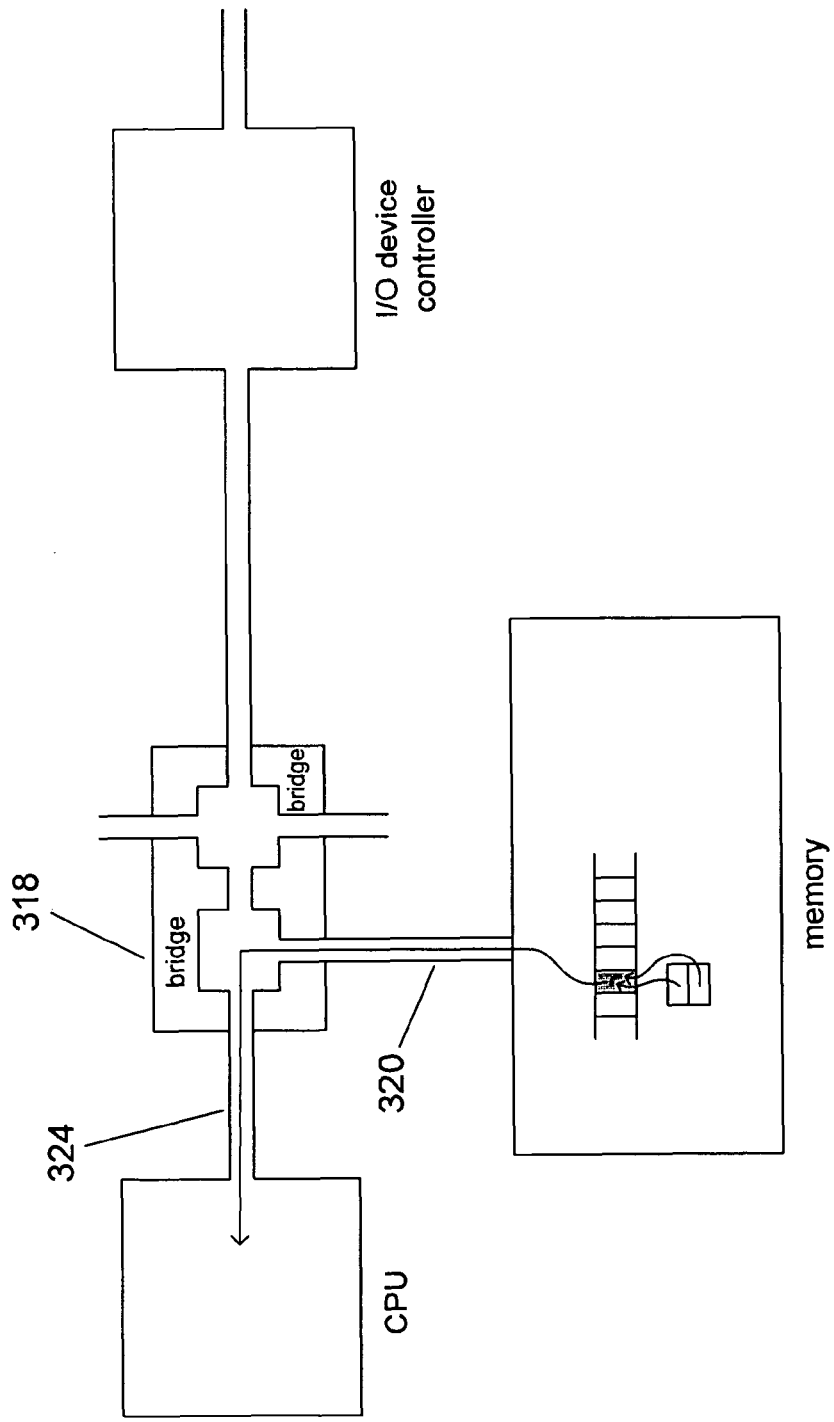
Figure 3D:
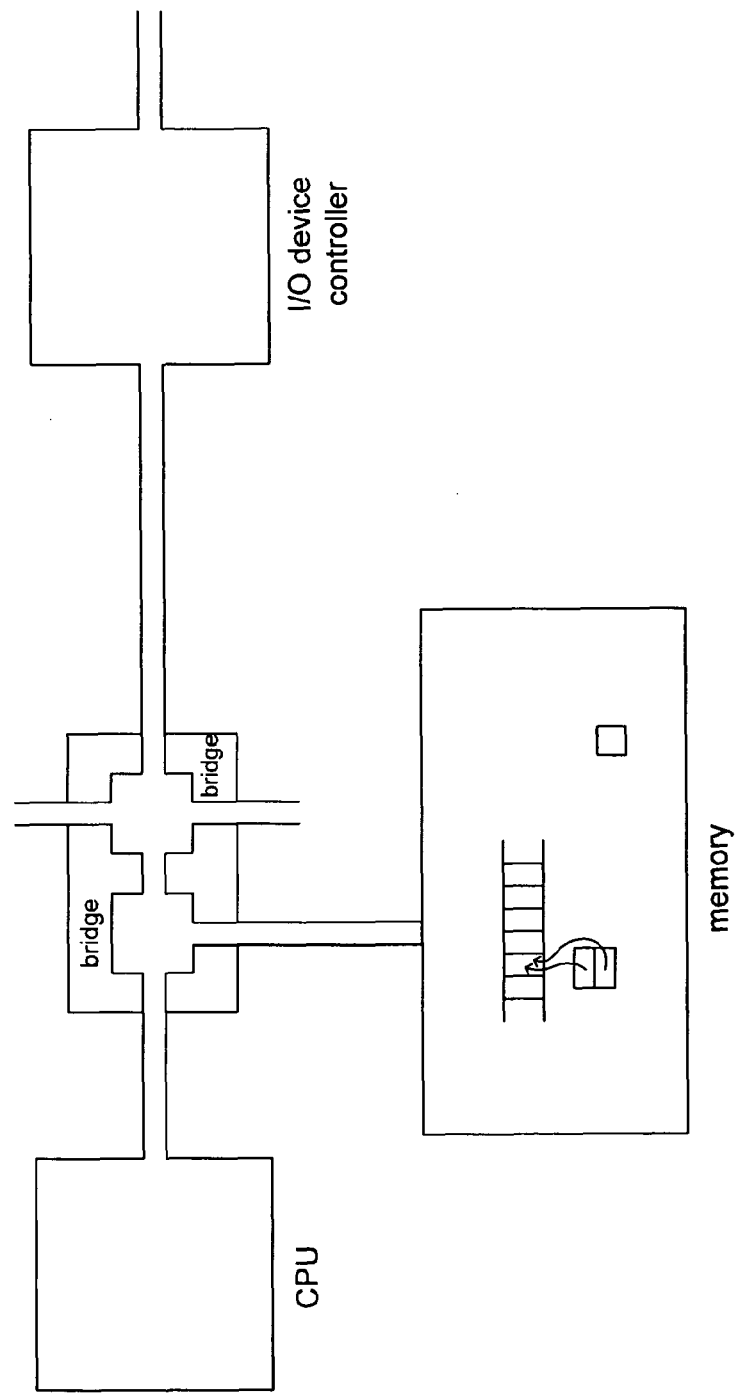

FIGS. 3A-G illustrate communication between an I/O-device controller and a CPU running an operating system program within a generic computer system. The I/O-device controller 302 may, for example, have received a block of data 304 from a communications or storage device for transfer to memory 306 for subsequent operating-subsequent operating-system processing. In such situations, the I/O-device controller and operating system may communicate through a first-in-first-out ("FIFO") queue 308 in memory. The FIFO queue comprises an array of queue entries 310, a queue-head pointer 312, and a queue-tail pointer 314. As shown in FIG. 3B, the I/O-device controller generally has direct memory access, allowing the I/O-device controller to transmit the data block (304 in FIG. 3), via a peripheral bus 316, a host bridge 318, and a memory bus 320, to memory 306 for storage in the first available queue entry 322 in the FIFO queue 308. FIFO queues are generally managed as circular queues by using modulo arithmetic for incrementing and decrementing the head and tail pointers. At a later time, as shown in FIG. 3C, the CPU may access the queued data block via the memory bus 320, host bridge 318, and a processor system bus 324. In general, the CPU dequeues the queued data block from the FIFO queue and moves the data block to some other portion of memory from which the data block can be subsequently used by the operating system or by higher-level programs running above the operating system, as shown in FIG. 3D. Alternatively, the data block may be placed into memory by the I/O-device controller apart from the FIFO queue, with a reference to the stored data block stored in the FIFO queue rather than the data block itself.

In certain cases, communications between the I/O-device controller and CPU via the memory-resident FIFO queue may not be time critical. In such cases, there may be no need for the processor to immediately access and dequeue the queued entry, as shown in FIG. 3C, following queuing of the entry by the I/O-device controller, as shown in FIG. 3B. However, such cases are rare. In general, because an I/O-device controller may queue data to the FIFO queue irregularly, at times rapidly queuing many data blocks to the FIFO queue, and that other times remaining quiescent for long periods, the operating system executing on the CPU needs to rapidly detect and dequeue data blocks queued to the FIFO by the I/O-device controller so that the FIFO queue does not overflow, so that the I/O-device controller is not interrupted or delayed as a result of FIFO-queue overflow, and also so that higher-level-protocol timers do not expire as a result of a delay in the data higher-level-protocol timers do not expire as a result of a delay in the data being made accessible to higher-level routines within the operating system or higher-level application programs.

Figure 3E:
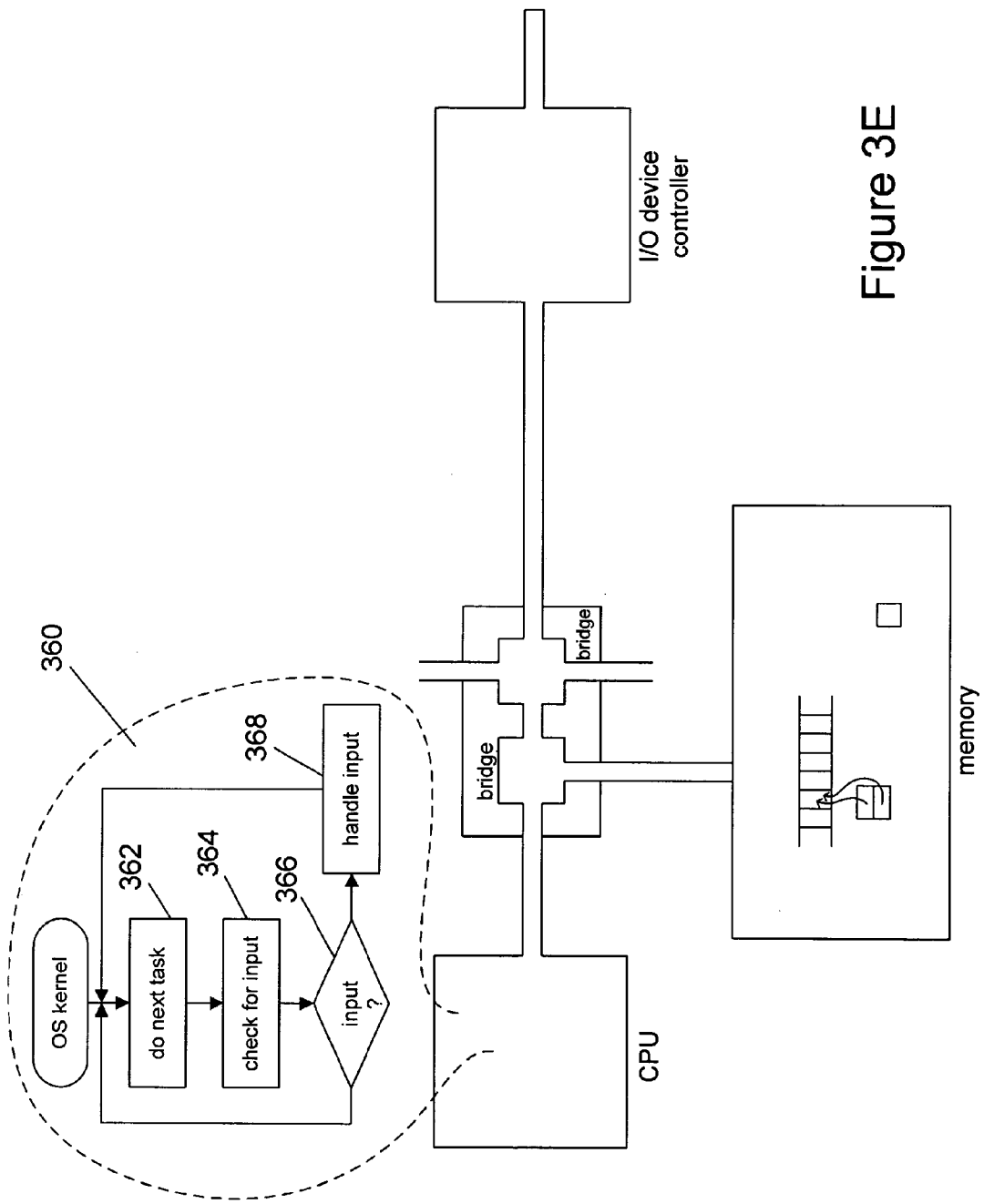

In general, there are two different strategies for notification of the operating system that the I/O-device controller has queued a new entry to a memory FIFO queue for processing by the operating system. A first strategy, referred to as "polling," is shown in FIG. 3E. In that strategy, the operating system includes an event loop, illustrated by a simple control-flow diagram 360 in FIG. 3E, in which the operating system continuously executes tasks 362, after each task checking, in step 364, for newly queued entries to various FIFO queues. When input is detected on a FIFO queue, as determined in step 366, then the input is handled in step 368. Because of the need for rapidly detecting and handling queued data items, the tasks executed in step 362 are generally very tiny portions of larger, conceptual tasks.

Polling is an effective strategy, particularly when entries are queued to FIFO queues at constant, regular rates, so that the polling frequency can be adjusted to match the entry-queuing frequency, and few polling operations are therefore wasted for checking empty queues. In modern computer systems, polling is generally far too inefficient for frequent and widespread use. Checking FIFO queues and other data structures in memory for indications of new input data requires a significant expenditure of processing cycles. When I/O devices, and other interrupt-generating devices, are quiescent, those cycles are expended in vain, and when I/O devices transfer data in burst at high rates, the polling frequency may be too low to prevent queue overflow and data-transfer interruptions due to flow-control backpressure.

FIG. 3F shows an alternative method by which an operating system detects newly queued input data. As shown in FIG. 3F, after the I/O-device controller queues an entry to the FIFO queue, the I/O-device controller generates an interrupt signal 370 which is transmitted to the CPU and results in an interrupt generated in the hardware of the CPU. Interrupt generation results in interruption of the normal sequence of instruction execution carried out by the operating system and a branch to an interrupt-service routine.

FIG. 3G illustrates interrupt handling from an operating-system perspective. In FIG. 3G, the operating system is currently executing a routine comprising an ordered sequence of instructions represented by the first column 382. Execution of an instruction and increment of an instruction-reference register is represented in FIG. 3G by curved arrows, such as arrow 380. An I/O-device controller generates an interrupt that is detected by the CPU during execution of the instruction 384 in the sequence of instructions 382. Following completion of execution of that instruction, execution branches to an interrupt-service routine ("ISR") 386 which saves the current context of the operating-system execution and dispatches the interrupt to an interrupt handler by calling an appropriate interrupt-handler routine 310. The interrupt handler may, for example, dequeue a queued entry from a FIFO queue and alter data structures to indicate reception of data, so that the operating system can subsequently process the data or pass the data through to higher-level operating-system routines or application programs. When the interrupt handler finishes execution, execution returns to the next instruction 310 that would have been executed had the interrupt not occurred, with the return from the interrupt handler generally facilitated by a return-from-interrupt instruction that restores the context of the operating-system routine 382 that was originally interrupted. Because many different interrupts may be signaled, and because interrupts may occur close in time, or even simultaneously, interrupt signaling is generally accompanied by privilege-level changes, disabling of interrupts in critical code, and mechanisms for stacking received interrupts.

FIG. 4 illustrates the INTx interrupt mechanism employed in the PCI-bus architecture. As discussed above, the PCI is a parallel bus. Addresses and data are multiplexed over common signal lines, with 32 or 64 bits transferred in each cycle. As shown in FIG. 4, the PCI bus 402 includes, in addition to the data and address signal lines 404, a number of interrupt signal lines 406. In the PCI bus, there are four interrupt signal lines, designated A, B, C, and D. Each I/O-device controller occupying a slot on the PCI bus is configured to use one of the four interrupts for signaling the CPU. If there are more than four devices in PCI-bus slots, then multiple devices end up sharing one or more interrupts. When the host bridge 410 detects an interrupt signal on the PCI bus, the host bridge translates the PCI-bus interrupt signal to an advance-programmable-interrupt-controller ("APIC") 412 interrupt by signaling an APIC interrupt in response to the PCI-bus interrupt. The APIC then raises a CPU interrupt, passing to the CPU a byte or word encoding information about the interrupt that occurred, so that the operating system can use the encoded information to determine the nature of the interrupt and accordingly handle the interrupt. Thus, as shown in the lower portion of FIG. 4, I/O-device controller 414 may be assigned PCI-bus interrupt A. On signaling that interrupt, the host bridge 410 translates the interrupt to an APIC interrupt 416 and signals the corresponding APIC interrupt so that the APIC, in turn, raises an appropriate, corresponding interrupt in the CPU. This PCI-bus interrupt architecture is referred to as the "INTx" interrupt mechanism or "INTx interrupt mode."

Figure 5A:
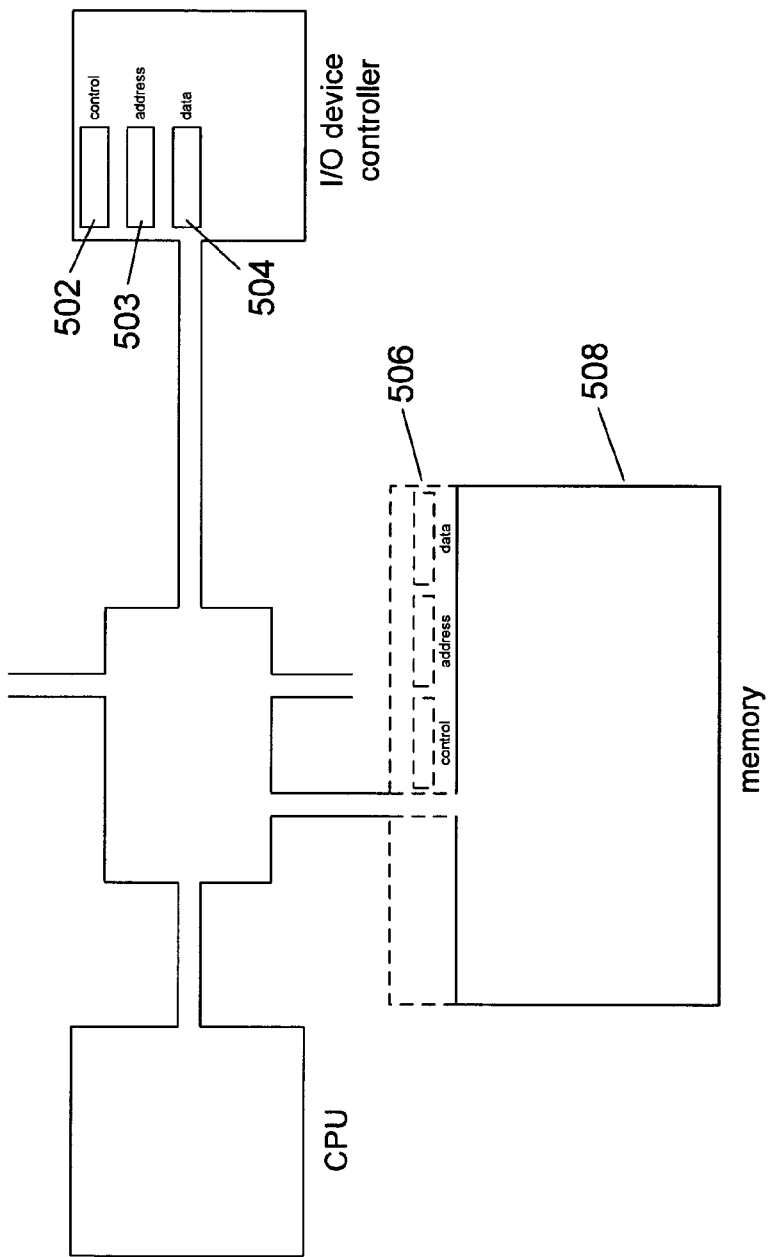
FIGS. 5A-C illustrate the MSI interrupt mechanism employed in later generations of PCI and in the PCIe.

In later versions of the PCI bus and PCIe, a different interrupt mechanism, referred to as "message signaled interrupt" ("MSI") mechanism, is employed. FIGS. 5A-D illustrate the MSI interrupt mechanism employed in later generations of PCI and in the PCIe. As shown in FIG. 5A, an I/O-device controller supporting MSI interrupts provides registers 502-

Figure 5B:
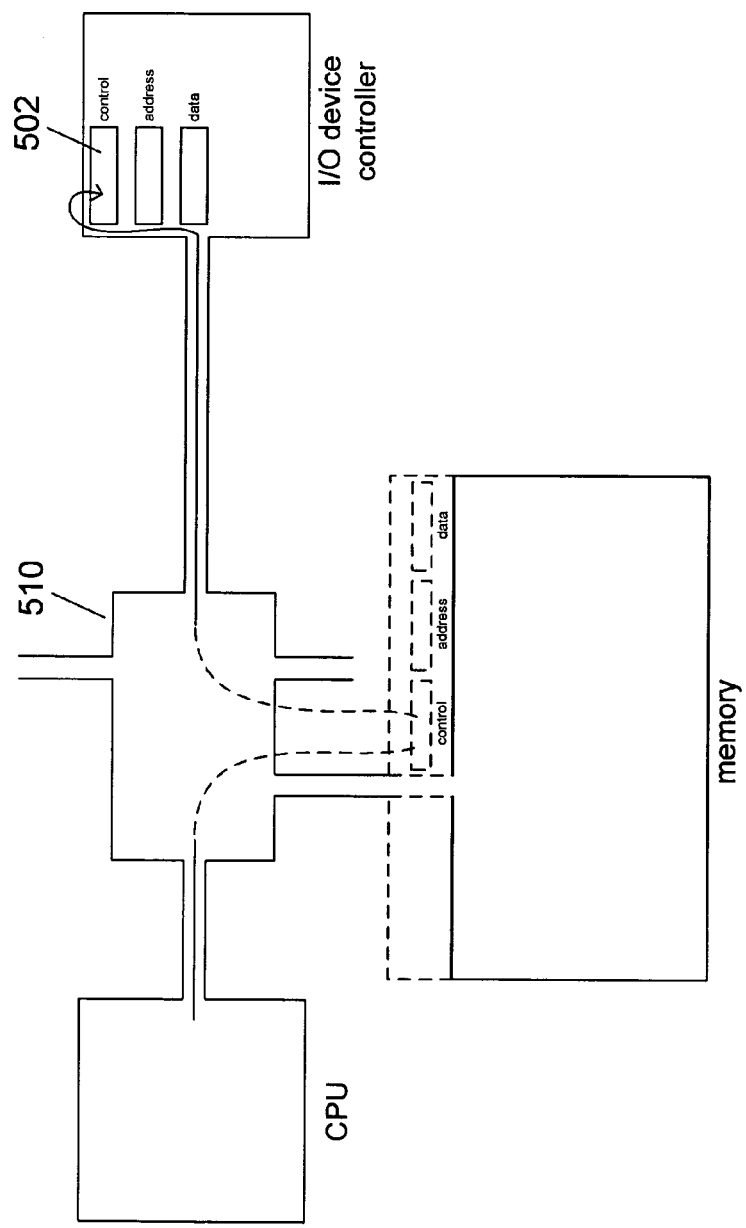
Figure 5C:
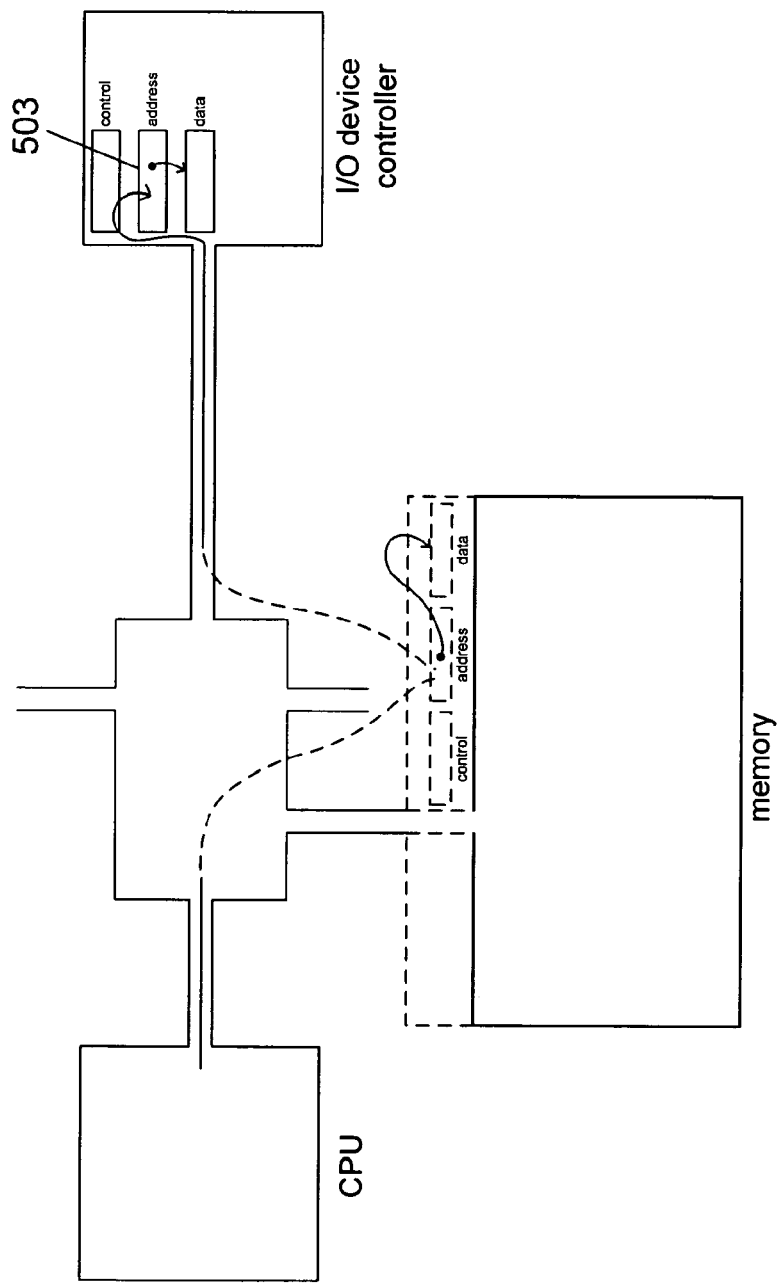

504 that allow an operating system running on the CPU to configure MSI interrupts. These registers are mapped to the CPU's address space so that the CPU can write values to the registers and read values from the registers during MSI-interrupt configuration as if the CPU were writing to, and reading from, memory. In FIG. 5A, the registers are shown in the I/O device controller as well as in a dashed rectangle shown above system memory 508, to illustrate that the operating system views the registers, located in the I/O device, as part of the memory address space accessible to the operating system. The operating system writes to these registers as is writing to an actual memory location. The dashed lines indicate, however, that the registers are not memory registers, but are instead locate din the I/O device. During system initialization, the operating system undergoes a process by which the devices interconnected with the CPU via a peripheral interconnect are discovered and queried for capabilities. When the operating system discovers a device capable of MSI interrupts, and the operating system chooses to employ the MSI-interrupt mechanism, then an indication to that effect is placed effect is placed by the operating system into a control register 502, as shown in FIG. 5B. Again, the operating system writes to an address within the operating system's memory address space, and the write is then directed by the host bridge 510 to the I/O device, rather than to memory. During the configuration process, an address register 503 is configured with an address to which the I/O-device controller writes a data value in order to generate an interrupt. The data register 504 is also configured to contain a data value. Certain low order bits of this data value may be changed by the I/O device to indicate different interrupts, depending on the number of vectors that the I/O device requests, and on how many vectors the operating system allows the I/O device to use. Subsequently, as shown in FIG. 5C, when the I/O-device controller desires to generate an interrupt to the CPU, the I/O-device controller issues a memory write operation to the address in 503, writing to the address a modified version of the data value stored in the data register 504 to indicate the type of interrupt that needs to be raised in the CPU. The host bridge may detect the write operation and translate it into an interrupt to the CPU, or, alternatively, the write may execute to system memory, and a low-level process may detect such writes and generate an interrupt within the CPU. A later interrupt mechanism, referred to as "MSI-X," provides for increased numbers of possible interrupt vectors that can be signaled by functions of an I/O-device controller, increases the number of addresses to which an I/O-device controller can write in order to generate interrupts, and provides additional flexibility through additional features. The MSI-interruption mechanism is preferred, in modern devices, because it allows for the elimination of physical interrupt-pin connections and traces, and provides a larger number of different interrupt signals to avoid requiring interrupt-generating devices to share a given interrupt signal line.

Figure 6:
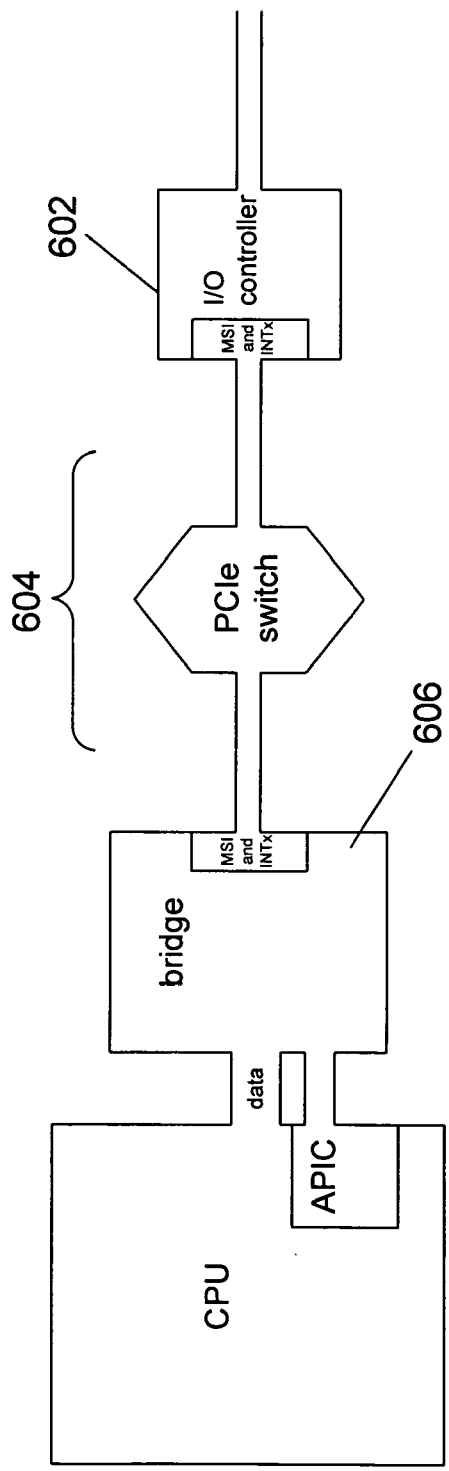
FIG. 6 shows a basic approach to PCIe compatibility with older operating system and BIOS layers that predate the PCIe peripheral interconnect.

FIG. 6 shows a basic approach to PCIe compatibility with older operating system and BIOS layers that predate the PCIe peripheral interconnect. As shown in FIG. 6, a PCIe-compliant I/O-device controller 602, PCIe peripheral interconnect 604, and a PCIe-compliant I/O bridge within a host bridge 606 can be incorporated into a computer system in order to update the computer system from PCI to PCIe. However, the operating system and the upstream components can remain unchanged, since the higher-level unchanged, since the higher-level interface to PCI protocols can also be used for the PCIe peripheral interconnect. The differences between the serial-communications architecture and the parallel-bus architecture are fully encapsulated within the hardware ports and connections and the first two layers of the PCI protocol stack. In order to provide full compatibility, new PCIe-compatible I/O-device controllers are recommended to provide both MSI interrupts and to provide a PCIe emulation of the older INTx mechanism. INTx interrupts are sent, as messages, over the PCIe serial communications medium, but are translated in the host bridge or another component to generate the older-style INTx interrupt signals to the CPU.

Figure 7:
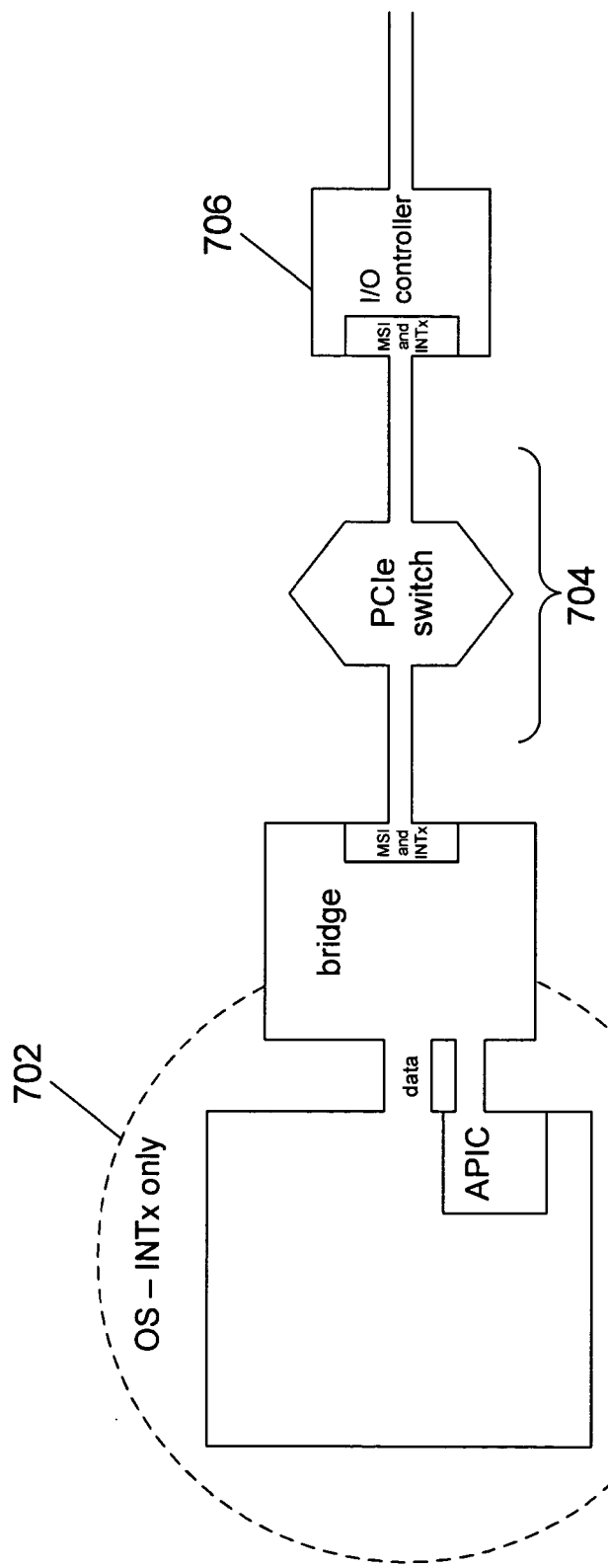
FIG. 7 illustrates a compatibility problem that has recently arisen.

FIG. 7 illustrates a compatibility problem that has recently arisen. As shown in FIG. 7, there remain many computer systems with operating systems and/or BIOS systems that continue to employ the older style INTx interrupt mechanism 702. As discussed with reference to FIG. 6, these systems can be updated to employ the PCIe peripheral-interconnect 704. However, as more and more systems move to PCIe, many manufacturers of I/O-device controllers have completely discontinued support of the older-style INTx interrupts. Thus, as shown in FIG. 7, the system manufacturers and users may often attempt to include newer I/O-device controllers 706 lacking support for INTx interrupts into systems with older style operating systems and BIOS layers that are designed to use only the older-style INTx interrupts 702. In fact, the I/O-device controllers that lack support for older-style INTx interrupts cannot properly function in such environments.

Figure 8:
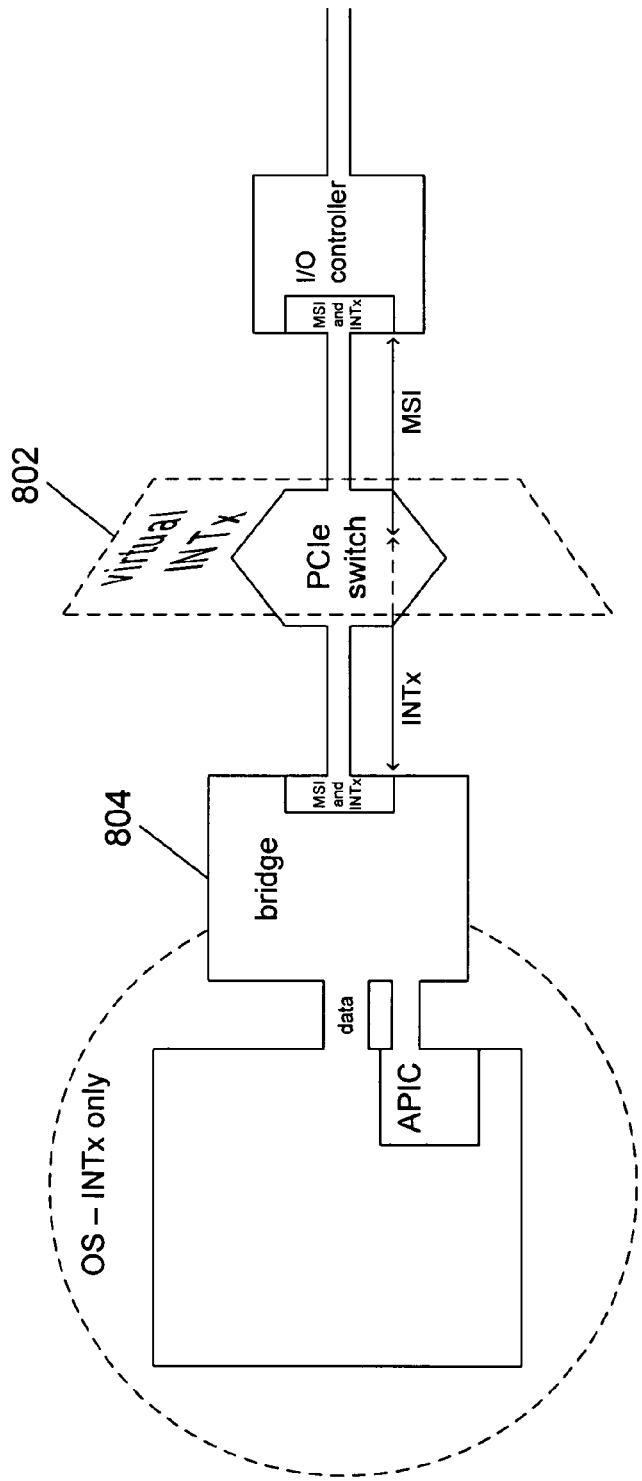
FIG. 8 illustrates an approach to surmounting the incompatibility problems illustrated in FIG. 7, according to embodiments of the present invention.

FIG. 8 illustrates an approach to surmounting the incompatibility problems illustrated in FIG. 7, according to embodiments of the present invention. Embodiments of the present invention introduce a virtual-INTx interface 802 upstream from an I/O-device controller that does not support the INTx interrupt mechanism. This virtual-INTx interface 802 may be conveniently implemented within a PCIe switch, as shown in FIG. 802, but may alternatively be implemented within an I/O bridge or as a separate device. The virtual-INTx interface 802 provides to the operating system a virtual interface to I/O-device controllers in which newer I/O-device controllers that support only MSI and MSI-X interrupts appear to support MSI and MSI-X interrupts as well as older-style INTx interrupts. The virtual-INTx interface receives MSI memory-write operations interface receives MSI memory-write operations from I/O-device controllers that do not support the INTx interrupt mechanism and translates these MSI memory writes into INTx interrupt-emulation messages, when the virtual-INTx interface is implemented in a PCIe switch, that are then forwarded to the host bridge 804. Alternatively, when implemented as part of the I/O bridge, the virtual-INTx interface may translate MSI memory writes into INTx interrupt-emulation messages within the host bridge 804. In addition, the virtual-INTx interface provides INTx-compatibility indications and information to operating systems and BIOS layers and configures MSI interruption on virtualized I/O-device controllers that do not support INTx emulation.

Figure 9A:
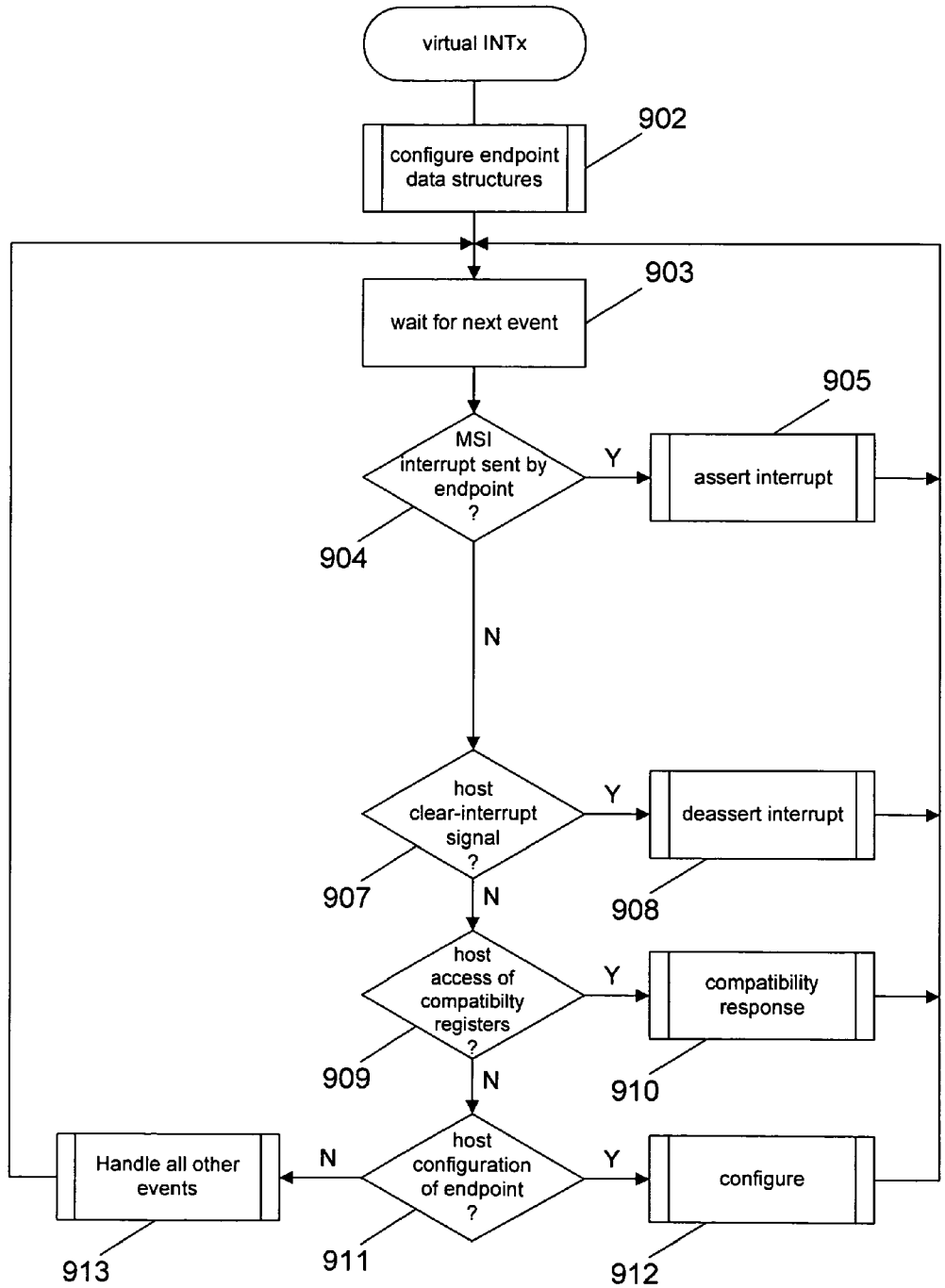
FIGS. 9A-F provide control-flow diagrams that illustrate the logical implementation of a virtual-INTx interface within a PCIe switch that represents one embodiment of the present invention.

FIGS. 9A-F provide control-flow diagrams that illustrate the logical implementation of a virtual-INTx interface within a PCIe switch that represents one embodiment of the present invention. FIG. 9A illustrates the virtual INTx implementation at a high level, as an event-handling loop within a PCIe switch or dedicated device lying between an I/O-device controller and an I/O bridge or host bridge. In step 902, a set of data structures and other information is configured for all of the endpoint devices on the PCIe peripheral interconnect. Then, in a continuous loop comprising steps 903-913, the virtual INTx interface continuously waits for a next event, and, when the event is related to the virtual-INTx interface, appropriately handles the event. For example, when the virtual-INTx interface detects reception of a memory-write operation transmitted by an I/O-device controller to raise an interrupt on a CPU, then the routine "assert interrupt" is called in step 905. When the virtual-INTx interface receives an interrupt-clear signal from the CPU, as detected in step 907, in which the CPU writes to either a bit in the I/O device or a bit in the virtual INTx interface, then the routine "deassert interrupt" is called, in step 908. When the virtual-INTx interface detects access, by the operating system or BIOS, of compatibility information stored within the I/O-device controller, in step 909, the virtual-INTx interface calls a compatibility-response routine, in step 910. When the detected event is an attempt by the host to configure an endpoint device, as determined in step 911, the routine "configure" is called in step 912. All other events that may be detected by the virtual-INTx interface within a PCIe switch are appropriately handled by a catch-all event handler in step 913.

Figure 9B:
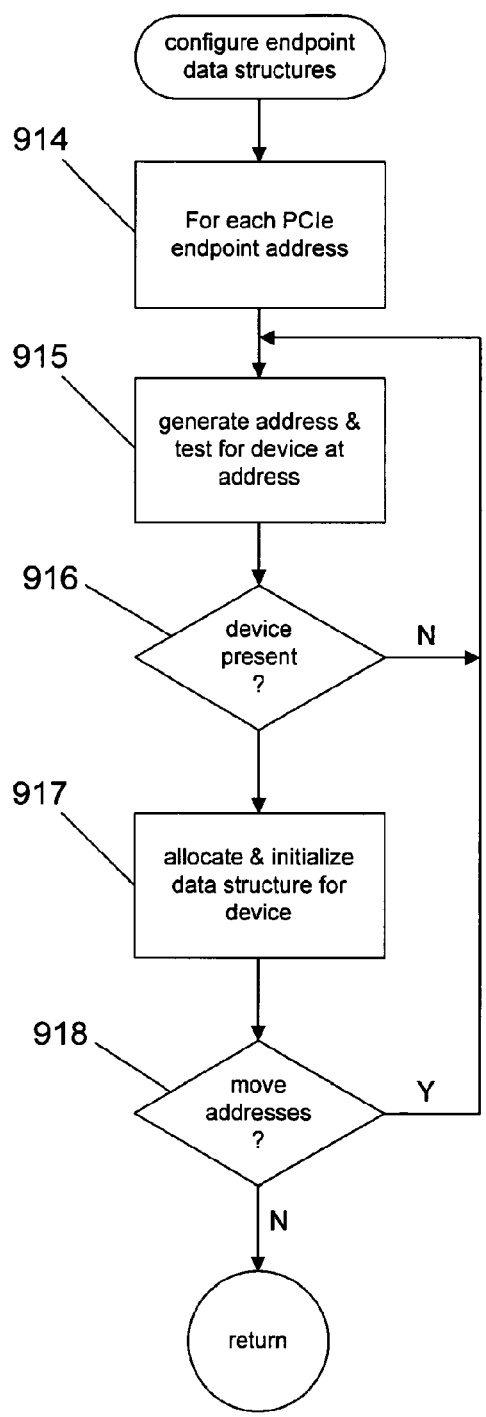

FIG. 9B provides a control-flow diagram for the routine "configure end point data structures," called in step 902 of FIG. 9A. In the for-loop of steps 914-918, a data structure is generated and initialized for each device connected to the PCIe peripheral interconnect. The data structure may vary with various implementations, but include an indication of the address of each end point device connected to the PCIe and an indication of the configuration status of the device. Initially, the configuration status is "unconfigured."

Figure 9C:
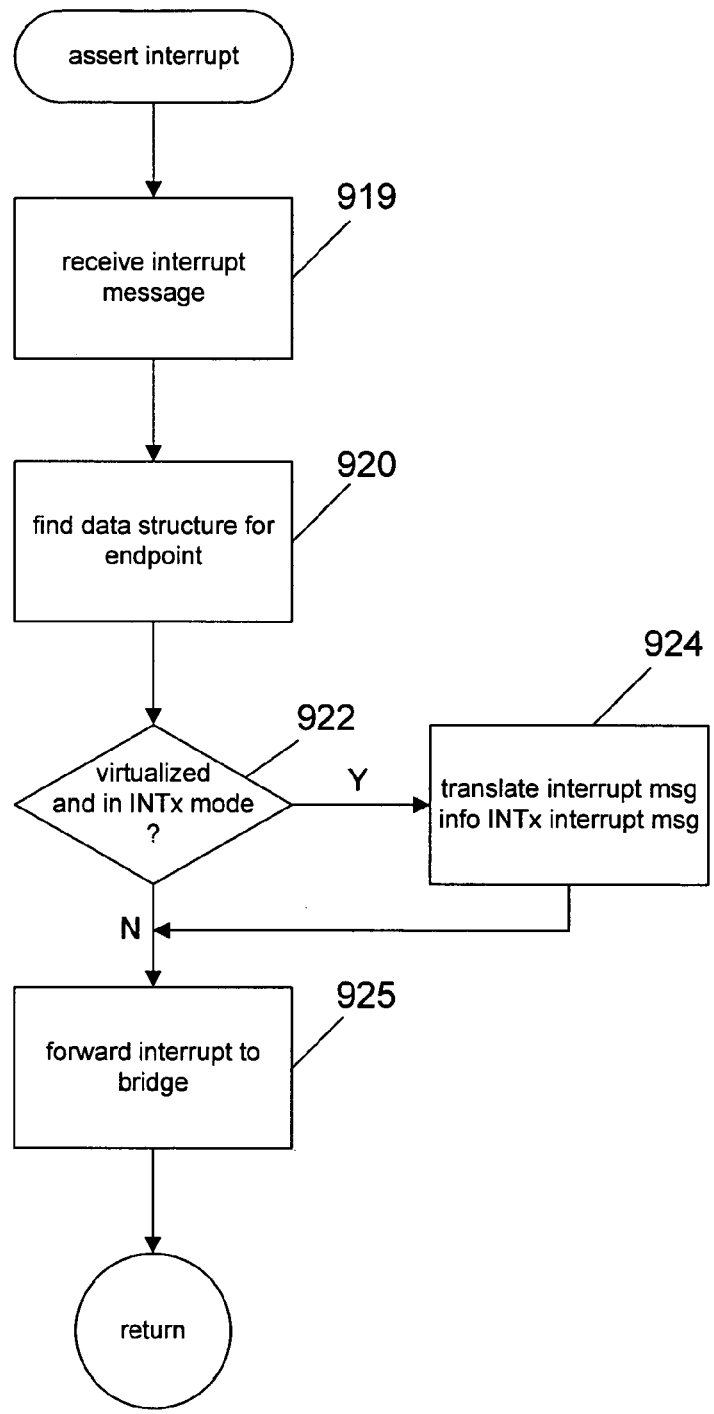

FIG. 9C provides a control-flow diagram for the routine "assert interrupt" called in step 905 of FIG. 9A. This routine intercepts a memory WRITE command, in step 919, generated by an I/O-device controller or other interrupt-generating device connected to the PCIe. In step 920, the routine "interrupt" finds the data structure corresponding to the device that sent the interrupt message. When the device is virtualized and in INTx-interrupt mode, as determined in step 922, the interrupt message is translated by the virtual-INTx interface to an INTx-interrupt-emulation message (Assert INTx Message) in step 924. In the case that the device is virtualized and operating in INTx-interrupt mode, the translated INTx-interrupt-emulation message is forwarded to the host bridge, in step 925. When the device is not virtualized or is not operating in INTx-interrupt mode, then the original WRITE command received in 918 is forwarded to the host bridge in step 925.

Figure 9D:
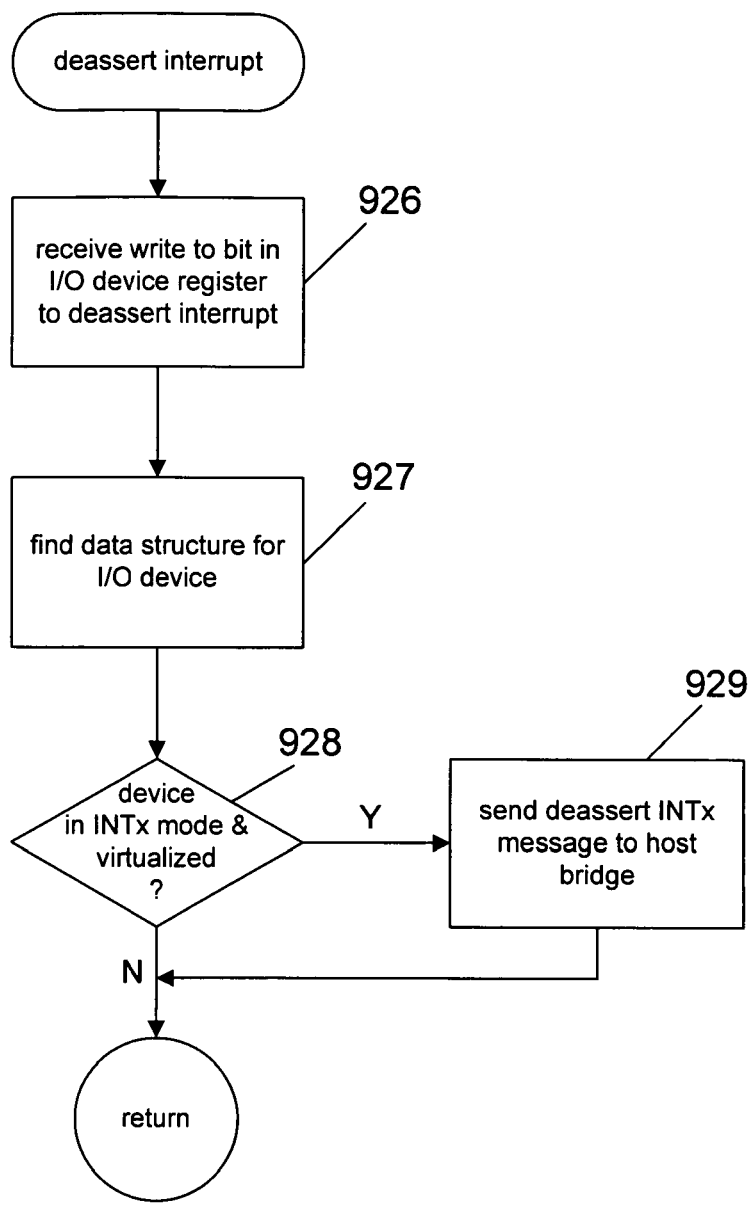

FIG. 9D provides a control-flow diagram for the routine "deassert interrupt," called in step 908 of FIG. 9A. In step 926, the routine "deassert interrupt" detects a write to a bit in the I/O device, or intercepts a write to a bit in the virtual INTx interface, generated by an operating system or BIOS. In step 927, the routine "deassert interrupt" finds the data structure corresponding to the device to which the operating system or BIOS directed the bit-write operation. When the device is virtualized and in INTx-interrupt mode, as determined in step 928, an INTx-interrupt-emulation message, De-assert INTx Message, is forwarded to the host bridge, in step 929.

Figure 9E:
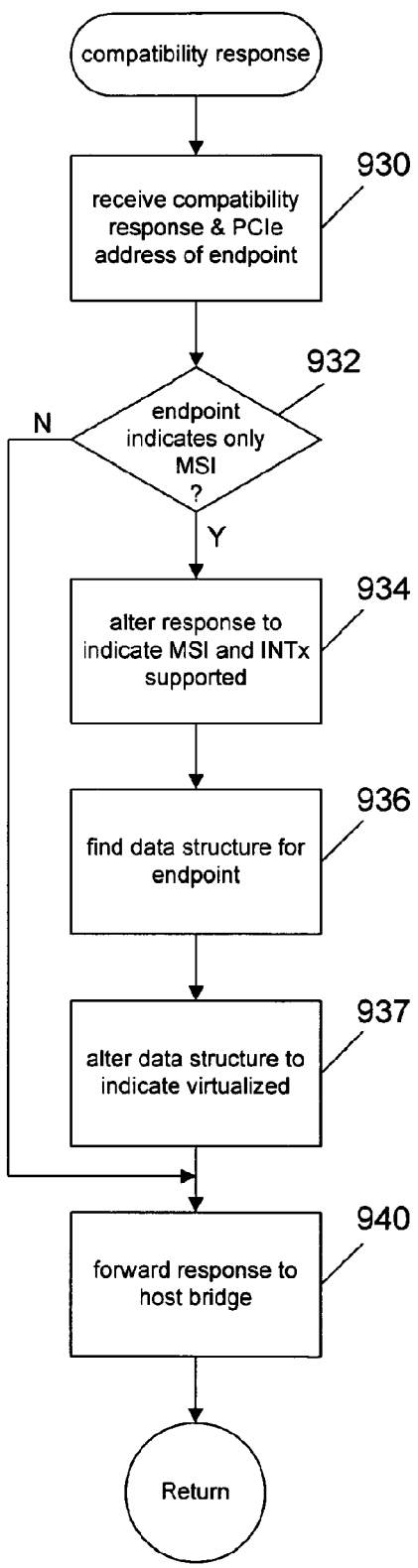

FIG. 9E provides a control-flow diagram of the routine "compatibility response" called in step 907 of FIG. 9A. This routine intercepts a response, in step 930, by an I/O-device controller or other interrupt-generating device connected to the PCIe, to connected to the PCIe, to access, by an operating system or BIOS layer, to registers containing data representing the characteristics and compatibilities of the device, in order to facilitate configuration of the device. When the response by the device indicates that the device supports both MSI and older-style INTx interrupts, or when the response by the device indicates that the device supports only older-style INTx interrupts, as determined in step 932, then the response is forwarded by the virtual-INTx interface and PCIe switch to the host bridge, in step 940. When the response by the device indicates that the device supports only MSI interrupts, the virtual-INTx interface alters the response to indicate that the responding device supports both MSI and INTx interrupts, in step 934 and, in steps 936-937, finds and updates the data structure corresponding to the device to indicate that the device has been virtualized by the virtual-INTx interface.

Figure 9F:
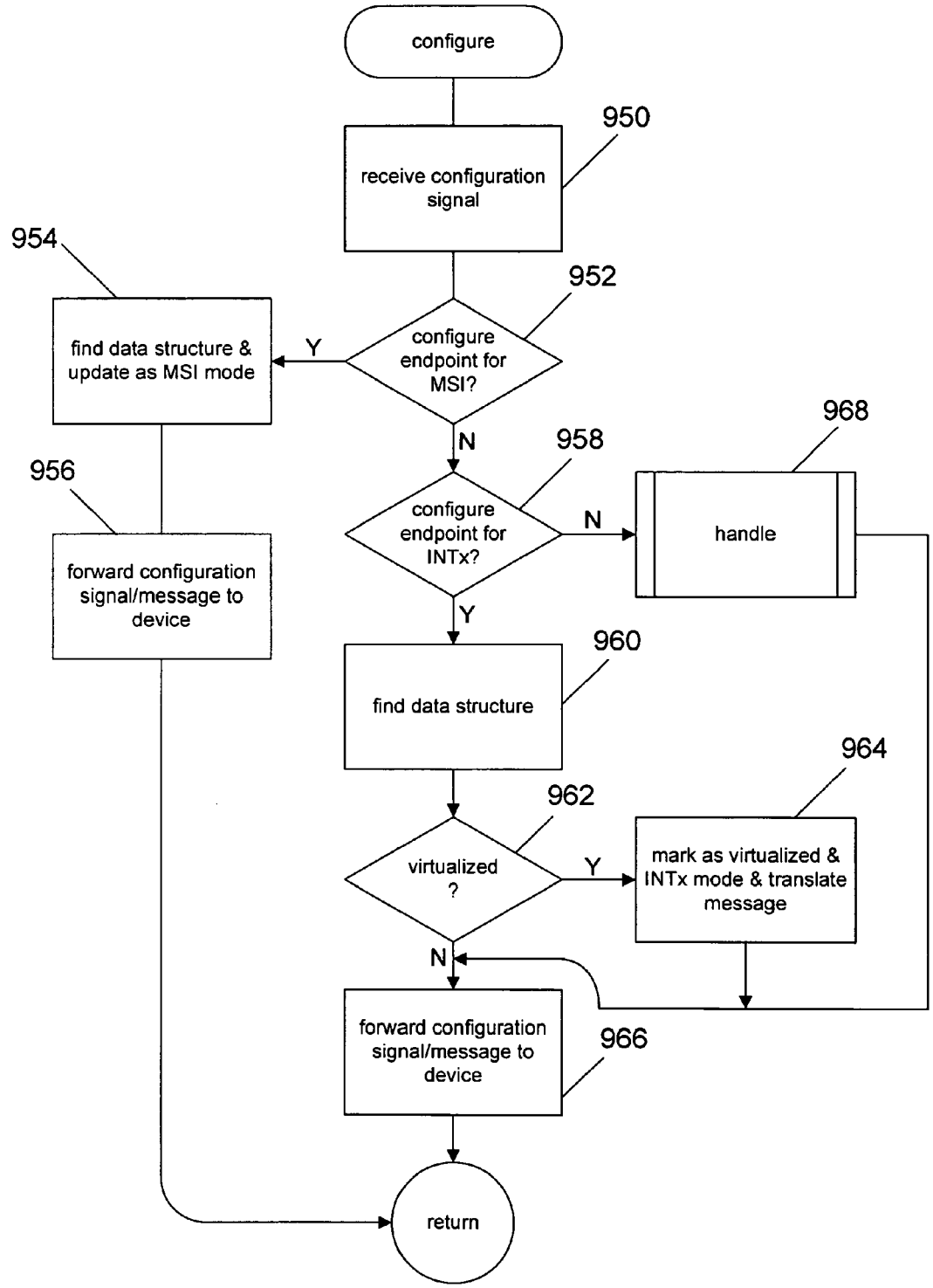

FIG. 9F provides a control-flow diagram for the routine "configure," called in step 909 of FIG. 9A. A signal or message is received, in step 950, representing an attempt by the operating system or BIOS to configure an I/O-device controller or other interrupt-generating device connected to the PCIe peripheral interconnect. When the configuration signal or message represents an attempt to initialize the device for MSI interrupts, as determined in step 952, then, in step 954, the virtual-INTx interface finds a data structure corresponding to the device being configured and updates the data structure to indicate that the device will operate in MSI-interrupt mode. Then, in step 956, the configuration signal or message is forwarded onto the device by the virtual-INTx interface. Otherwise, when the configuration signal or message is directed to the device to configure the device for INTx interrupts, as determined in step 958, then the data structure for the device is found, in step 960, and checked to determine whether or not the device is virtualized, in step 962. When the device is virtualized, the data structure is updated to indicate that the device is both virtualized and operating in INTx mode, in step 964, and the configuration message or signal is translated to an MSI configuration procedure. In either case, one or more configuration signals or messages are then forwarded to the device, in step 966. In one case, when the device is not virtualized, the configuration message or signal can be passed through. In the case that the device is virtualized, then then INTx configuration is translated into MSI configuration, which may involve multiple device-register writes. In certain cases, a particular configuration operation may involve a sequence of signals or operations. All the signals or operations in the sequence can be treated separately by separate calls to the routine "configure," although not all of the signals or operations in the sequence may need to be translated to MSI messages in step 964. Alternatively, "configure" can be implemented to handle all signals or operations in a sequence in one call. When the configuration signal or message indicates neither MSI-style nor INTx interrupts are to be configured, then the received configuration signal or message is handled in step 968.

The virtual-INTx interface may be implemented as a message-and/or-signal receiving component that receives interrupt messages, configuration messages or configuration signals, and responses to compatibility accesses in steps 918, 950, and 930 of FIGS. 9C-F and a message-and/or-signal processing component that configures interrupt-generating devices, responds to capability queries, and translates interrupt messages from virtualized interrupt-generating devices. Many different alternative implementations are possible.

The virtual-INTx interface, which represents one embodiment of the present invention, has been characterized broadly in the above discussion. The specific methods and protocols for device configuration, interrupt generation, and other aspects of both the old-style INTx-interrupt mechanism and the newer MSI and MSI-X mechanisms may vary, from implementation to implementation. Moreover, alternative embodiments of the present invention may be employed to introduce a virtual-interrupt interface into other types of communications media and data-transfer channels in order to restore compatibility for newer devices that fail to emulate older interruption method and mechanisms. Whatever the precise implementation details and interfaces, the virtual-interrupt interface needs to determine which devices are virtualized, needs to translate configuration of older-style devices into newer-style configure procedures, and needs to intercept newer-style interrupt messages or signals in order to emulate those newer-style interrupt messages or signals so that upstream devices, firmware, and software can interact with the device using older-style methods and interfaces.

Figure 10:
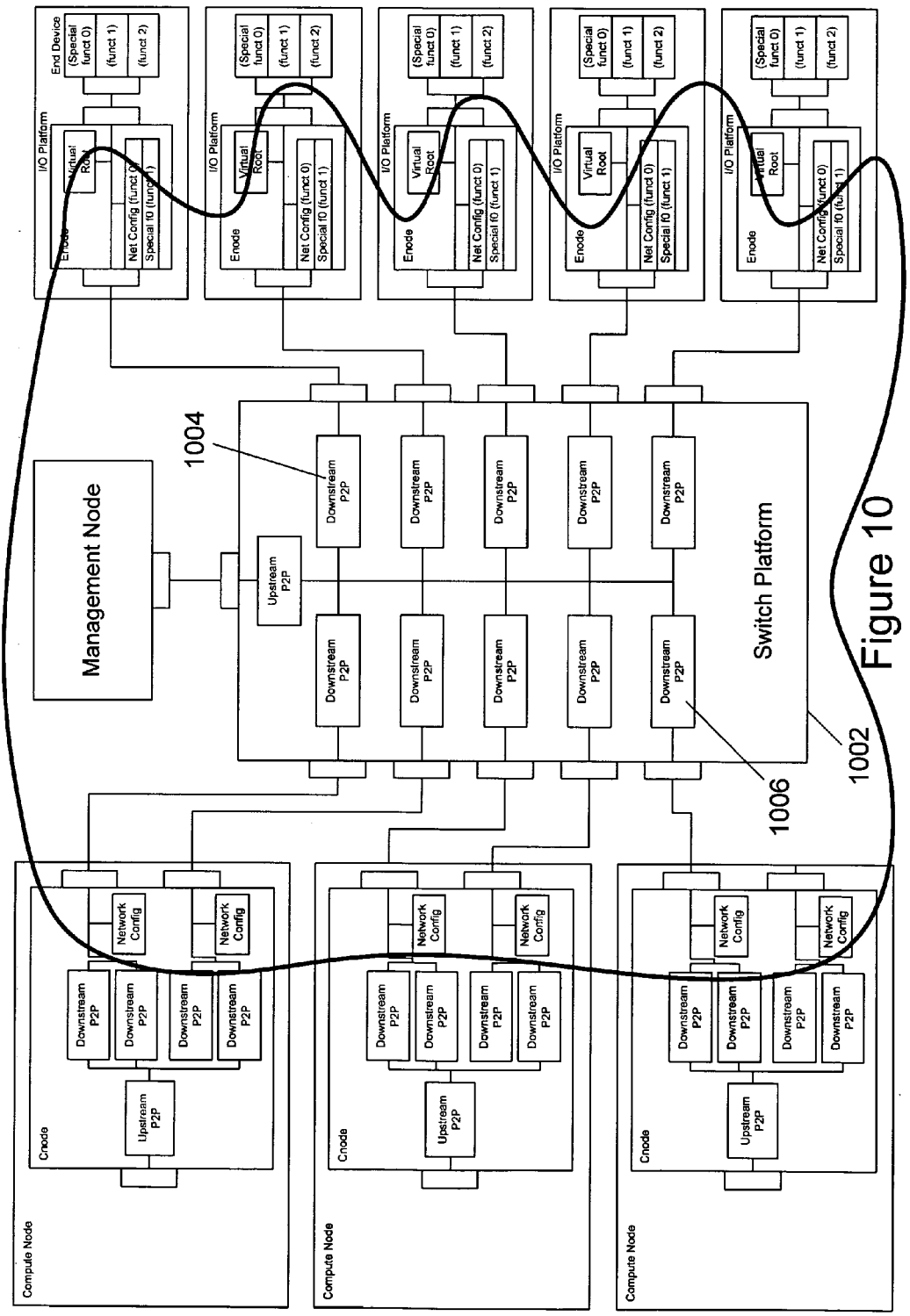
FIG. 10 illustrates a high-end computer system including a switch platform.

Although the present invention has been described in terms of particular embodiments, it is not intended that the invention be limited to these embodiments. Modifications within the spirit of the invention will be apparent to those skilled in the art. For example, the virtual-INTx-interrupt interface may be incorporated into a PCIe switch, as a separate, discrete component between the PCIe switch and the host bridge, within the host bridge, or perhaps upstream from the host bridge, as a discrete component. A virtual-INTx-interrupt interface may be implemented using any number of different software, firmware, and hardware modules, using different types of logic circuits, and using different programming languages, control structures, data structures, and by varying other such programming and design variables. In more complex PCIe communications media, with multiple switches and additional fan-out levels, the virtual INTx-interrupt interface may be implemented in a highest-level switch, or may be alternatively implemented in each switch to handle any end point devices directly connected to the switch. Although the virtual-INTx interface has been discussed in the context of a simple computer system, virtual-INTx interfaces may be employed in complex switching platforms incorporated in high-end computer systems, including blade enclosures. FIG. 10 illustrates a high-end computer system including a switch platform. The switch platform may provide virtual-INTx interfaces in downstream P2P components, such as downstream P2P component 1004, in upstream P2P components, such as upstream P2P component 1006, or as a separate layer or component within the switch.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to suited to the particular use contemplated. It is intended that the scope of the invention be defined by the following claims and their equivalents:

The invention clained is:

1. A virtual-interrupt-mode interface comprising:
   a message-and/or-signal receiving component that receives interrupt messages, configuration messages or configuration signals, and responses to access to compatibility registers; and
   a message-and/or-signal processing component that
      configures an interrupt-generating device to operate in a first interrupt mode when the interrupt-generating device does not support a second interrupt mode and the message-and/or-signal receiving component has received a configuration message or signal directed to the interrupt-generating device to configure the interrupt-generating device to operate in the second interrupt mode; and
      translates each first-interrupt-mode interrupt message, received by the message and/or signal receiving component from one or more interrupt-generating devices operating virtually in the second interrupt mode, to a second-interrupt-mode interrupt and forwards the second-interrupt-mode interrupt to an intended recipient of the received first-interrupt-mode interrupt message.

2. The virtual-interrupt-mode interface of claim 1
   wherein the second interrupt mode is a PCI INTx interrupt mode; and
   wherein the first interrupt mode is a PCIe MSI or MSI-X interrupt mode.

3. The virtual-interrupt-mode interface of claim 2 incorporated within one of:
   a device introduced between the interrupt-generating device and a PCIe switch;
   the PCIe switch;
   a host-bridge device; and
   a device introduced between the PCIe switch and host-bridge device.

4. The virtual-interrupt-mode interface of claim 3
   wherein the PCIe switch, host-bridge device, or discrete device into which the virtual-interrupt-mode interface is incorporated is interconnected with the interrupt-generating devices by a PCIe interconnect; and
   wherein the PCIe switch, host-bridge device, or discrete device into which the virtual-interrupt-mode interface is incorporated is interconnected with at least one CPU on which interrupts are raised in response to interrupt messages generated by the interrupt-generating devices.

5. The virtual-interrupt-mode interface of claim 1 further including a data structure for each interrupt-generating device that includes an indication of a current status and interrupt mode for the interrupt-generating device.

6. The virtual-interrupt-mode interface of claim 5 wherein the data structure corresponding to each interrupt-generating device is initialized to indicate that the interrupt-generating device has not been configured.

7. The virtual-interrupt-mode interface of claim 1 wherein, when the message-and/or-signal receiving component detects a configuration signal from an entity directed at an interrupt-generating device capable of operating only in the first-interrupt-mode, returns a compatibility response to the entity wherein the response indicates that the interrupt-generating device can operate in both the second interrupt mode and the first interrupt mode.

8. A virtual-interrupt-mode interface comprising:
   a message-and/or-signal receiving component that receives interrupt messages, configuration messages or configuration signals, and responses to access to compatibility registers;
   wherein, when the message-and/or-signal receiving component receives a response, from an interrupt-generating device, to an access of compatibility registers, the message-and/or-signal processing component:
   determines whether the response indicates that the interrupt-generating device can operate only in the first interrupt mode;
   when the response indicates that the interrupt-generating device can operate only in the first interrupt mode, alters the response to indicate that the interrupt-generating device can operate in both the second interrupt mode and in the first interrupt mode, updates a data structure representing the interrupt-generating device to indicate that the interrupt-generating device is virtualized, and forwards the altered response to an intended recipient of the compatibility response; and when the response indicates that the interrupt-generating device can operate in both the second interrupt mode and in the first interrupt mode, or when the response indicates that the interrupt-generating device can operate only in second interrupt mode, forwards the response to the intended recipient of the compatibility response.

9. The virtual-interrupt-mode interface of claim 8 wherein, when the message-and/or-signal receiving component receives a configuration message or configuration signal directed to an interrupt-generating device, the message-and/or-signal processing component:
determines whether the configuration message or configuration signal represents an attempt to configure the interrupt-generating device to operate in the first interrupt mode;
when the configuration message or configuration signal represents an attempt to configure the interrupt-generating device to operate in the first interrupt mode, forwards the configuration message or configuration signal to the interrupt-generating device; and
when the configuration message or configuration signal represents an attempt to configure the interrupt-generating device to operate in the second interrupt mode,
determines, from the data structure representing the interrupt-generating device, whether or not the interrupt-generating device is virtualized,
when the interrupt-generating device is virtualized, updates the data structure representing the interrupt-generating device to indicate that the interrupt-generating device is operating virtually in the second interrupt mode, translates the configuration message or configuration signal into a first-interrupt-mode configuration message, and forwards the first-interrupt-mode configuration message to the interrupt-generating device, and
when the interrupt-generating device is not virtualized, forwards the configuration message or configuration signal to the interrupt-generating device.

10. The virtual-interrupt-mode interface of claim 8 wherein, when the message-and/or-signal receiving component receives a first-interrupt-mode interrupt message from an interrupt-generating device, the message-and/or-signal processing component:
determines, from the data structure representing the interrupt-generating device, whether or not the interrupt-generating device is virtualized and operating virtually in the second interrupt mode;
when the interrupt-generating device is virtualized and operating virtually in the second interrupt mode, translates the interrupt message into a second-interrupt-mode interrupt message or signal and forwards the translated interrupt message or signal to the intended recipient of the interrupt message; and
when the interrupt-generating device is not virtualized and operating virtually in the second interrupt mode, forwards the interrupt message or signal to the intended recipient of the interrupt message.

11. The virtual-interrupt-mode interface of claim 8 wherein, when the message-and/or-signal receiving component detects an attempted interrupt clear operation directed by an entity to an interrupt-generating device that is virtualized and operating virtually in the second interrupt mode, the message-and/or-signal processing component:
returns a second-interrupt-mode-deassert-emulation message to the entity.

12. A method for virtualizing an interrupt-generating device to an operating system or BIOS, the method comprising:
configuring the interrupt-generating device to operate in a first interrupt mode and to operate virtually in a second interrupt mode when the interrupt-generating device does not support the second interrupt mode and a configuration message or signal directed to the interrupt-generating device to configure the interrupt-generating device to operate in the second interrupt mode has been received;
translating first-interrupt-mode interrupt messages received from the interrupt-generating device operating virtually in the second interrupt mode to second-interrupt-mode interrupts and forwarding the second-interrupt-mode interrupts to the intended recipients of the received first-interrupt-mode interrupt messages; and
when an attempted interrupt clear operating directed by an entity to an interrupt-generating device that is virtualized and operating virtually in the second interrupt mode is detected, returning a second-interrupt-mode-deassert-emulation message to the entity.

13. The method of claim 12
wherein the second interrupt mode is a PCI INTx interrupt mode; and
wherein the first interrupt mode is a PCIe MSI or MSI-X interrupt mode.

14. The method of claim 13 executed within one of:
a device introduced between the interrupt-generating device and a PCIe switch;
the PCIe switch;
a host-bridge device; and
a device introduced between the PCIe switch and host bridge device.

15. The method of claim 14
wherein the PCIe switch, host-bridge device, or discrete device in which the method is executed is interconnected with at least one CPU on which interrupts are raised in response to interrupt messages generated by the interrupt-generating device.

16. The method of claim 12 further including creating and maintaining a data structure corresponding to each interrupt-generating device that includes an indication of a current status and interrupt mode for the interrupt-generating device.

17. The method of claim 16 further including initializing the data structure corresponding to each interrupt-generating device to indicate that the interrupt-generating device has not been configured.

18. The method of claim 16 further including:
when a response to access of a compatibility register or registers from an interrupt-generating device is received, determining whether the response indicates that the interrupt-generating device can operate only in the first interrupt mode;
when the response indicates that the interrupt-generating device can operate only in the first interrupt mode, altering the response to indicate that the interrupt-generating device can operate in both the second interrupt mode and in the first interrupt mode, updating the data structure representing the interrupt-generating device to indicate that the interrupt-generating device is virtualized, and forwarding the altered response to the intended recipient of the response; and
when the response indicates that the interrupt-generating device can operate in both the second interrupt mode and in the first interrupt mode, or when the response indicates that the interrupt-generating device can operate only in the second interrupt mode, forwarding the response to the intended recipient of the compatibility response.

19. The method of claim 16 further including:

when a configuration message or configuration signal directed to an interrupt-generating device is received, determining whether the configuration message or configuration signal represents an attempt to configure the interrupt-generating device to operate in the first interrupt mode;

when the configuration message or configuration signal represents an attempt to configure the interrupt-generating device to operate in the first interrupt mode, forward the configuration message or configuration message or configuration signal to the interrupt-generating device; and when the configuration message or configuration signal represents an attempt to configure the interrupt-generating device to operate in the second interrupt mode, determining, from the data structure representing the interrupt-generating device, whether or not the interrupt-generating device is virtualized, when the interrupt-generating device is virtualized, updating the data structure representing the interrupt-generating device to indicate that the interrupt-generating device is operating virtually in the second interrupt mode, translating the configuration message or configuration signal into a first-interrupt-mode configuration message or configuration signal, and forwarding the first-interrupt-mode configuration message to the interrupt-generating device, and when the interrupt-generating device is not virtualized, forwarding the configuration message or configuration signal to the interrupt-generating device.

20. The method of claim 16 further including:

when a first-interrupt-mode interrupt message from an interrupt-generating device is received, determining, from the data structure representing the interrupt-generating device, whether or not the interrupt-generating device is virtualized and operating virtually in the second interrupt mode;

when the interrupt-generating device is virtualized and operating virtually in the second interrupt mode, translating the interrupt message into a second-interrupt-mode interrupt message or signal and forwarding the translated interrupt message or signal to the intended recipient of the interrupt message; and when the interrupt-generating device is not virtualized and operating virtually in the second interrupt mode, forwarding the interrupt message or signal to the intended recipient of the interrupt message.

* * * * *

UNITED STATES PATENT AND TRADEMARK OFFICE
CERTIFICATE OF CORRECTION

PATENT NO. : 9,037,768 B2  
APPLICATION NO. : 12/937685  
DATED : May 19, 2015  
INVENTOR(S) : Hubert E. Brinkmann et al.

Page 1 of 1

It is certified that error appears in the above-identified patent and that said Letters Patent is hereby corrected as shown below:

In the claims

In column 14, lines 61-62, in Claim 18, delete "interrupt- generating" and insert -- interrupt-generating --, therefor.

Signed and Sealed this
Twenty-seventh Day of October, 2015

Michelle K. Lee
*Director of the United States Patent and Trademark Office*